(12) United States Patent
Jahanbin et al.

(10) Patent No.: US 11,262,195 B2
(45) Date of Patent: Mar. 1, 2022

(54) SURFACE ROUGHNESS ANALYSIS SYSTEM AND METHODS OF ANALYZING SURFACE ROUGHNESS OF A WORKPIECE

(71) Applicant: The Boeing Company, Chicago, IL (US)

(72) Inventors: Shahrooz M. Jahanbin, Mukilteo, WA (US); Jeong-Beom Ihn, Bellevue, WA (US); Gary E. Georgeson, Tacoma, WA (US); Nihar Ashokkumar Desai, Bothell, WA (US)

(73) Assignee: The Boeing Company, Chicago, IL (US)

( * ) Notice: Subject to any disclaimer, the term of this patent is extended or adjusted under 35 U.S.C. 154(b) by 44 days.

(21) Appl. No.: 16/806,894

(22) Filed: Mar. 2, 2020

(65) Prior Publication Data
US 2021/0270604 A1 Sep. 2, 2021

(51) Int. Cl.
*G01B 17/08* (2006.01)
*G01N 29/04* (2006.01)
*G01N 29/11* (2006.01)
*G01N 29/44* (2006.01)

(52) U.S. Cl.
CPC ........... *G01B 17/08* (2013.01); *G01N 29/041* (2013.01); *G01N 29/11* (2013.01); *G01N 29/4436* (2013.01)

(58) Field of Classification Search
CPC .... G01B 17/08; G01N 29/041; G01N 29/226; G01N 29/24; G01N 29/0654; G01N 29/043; G01N 29/0645; G01N 29/07; G01N 29/11; G01N 29/4436
See application file for complete search history.

(56) References Cited

U.S. PATENT DOCUMENTS

| | | | | |
|---|---|---|---|---|
| 4,484,475 A | * | 11/1984 | Ogura | G01L 1/255 73/579 |
| 4,555,948 A | * | 12/1985 | Miyamoto | G01N 29/11 73/640 |
| 5,035,144 A | * | 7/1991 | Aussel | G01N 29/42 73/602 |
| 5,249,466 A | * | 10/1993 | Jones | G01N 29/07 73/633 |

(Continued)

FOREIGN PATENT DOCUMENTS

CN 109341608 A 2/2019

OTHER PUBLICATIONS

European Patent Office Extended Search Report dated Jul. 6, 2021 regarding EP Application No. 21159765.3; 9 pages.

(Continued)

*Primary Examiner* — Helen C Kwok
(74) *Attorney, Agent, or Firm* — Yee & Associates, P.C.

(57) ABSTRACT

A surface roughness analysis system and methods of analyzing surface roughness of a workpiece are presented. The surface roughness analysis system comprises a number of wave generators; a number of wave sensors; and an ultrasonic analysis system configured to receive material mechanical parameters for a workpiece, determine incident surface wave signal parameters for a source signal to be sent by the number of wave generators, and determine a cut-off wavelength using the material mechanical parameters, wherein the cut-off wavelength is a ratio of surface wavelength over incident wavelength.

31 Claims, 10 Drawing Sheets

(56) References Cited

U.S. PATENT DOCUMENTS

| | | | | |
|---|---|---|---|---|
| 5,767,408 A * | 6/1998 | Lindgren | ............ | G01N 29/041 |
| | | | | 310/336 |
| 6,155,117 A * | 12/2000 | Stevens | ............... | G01N 29/041 |
| | | | | 228/104 |
| 8,583,407 B2 * | 11/2013 | Volker | ............... | G01N 29/0672 |
| | | | | 703/6 |
| 2010/0131246 A1 * | 5/2010 | Volker | ............... | G01N 29/4427 |
| | | | | 703/1 |
| 2018/0340858 A1 | 11/2018 | Jahanbin et al. | | |
| 2020/0047425 A1 | 2/2020 | Jahanbin et al. | | |
| 2020/0096330 A1 * | 3/2020 | Lim | ..................... | G01N 29/343 |
| 2020/0292503 A1 * | 9/2020 | Klaassen | ............. | G01N 29/226 |

OTHER PUBLICATIONS

Jahanbin et al.; "Application of Ultrasonic Guided Waves for Surface Roughness Measurement"; In: proc of the 12th Intl. Workshop on Structural Health Monitoring; Sep. 10-12, 2019; 11 pages.

* cited by examiner

SURFACE ROUGHNESS ANALYSIS SYSTEM AND METHODS OF ANALYZING SURFACE ROUGHNESS OF A WORKPIECE

BACKGROUND INFORMATION

1. Field

The present disclosure relates generally to non-destruction inspection and, more specifically, to a system and methods for analyzing surface roughness of a workpiece.

2. Background

Surface roughness is a component of surface texture. Surface roughness is a product of manufacturing processes. In surface metrology, the term "roughness" is typically applied to the high-frequency and short-wavelength parameters of a finished surface. Surface roughness can be described as a series of peaks and valleys of the surface.

Surface roughness can be directly associated with the properties and control of the manufacturing. For some goods, surface roughness only affects aesthetics. For mechanical components, roughness is often a predictor for the performance of the components. Roughness is associated with the propagation of inconsistencies. Thus, roughness is often undesirable.

Current methods of roughness analysis include visual inspection or a contact probe. Visual inspection is performed by comparing example specimens with various known roughnesses to a workpiece being analyzed. Visual inspection is limited in its accuracy.

A contact probe makes contact with a surface to be analyzed. The contact probe measures roughness by quantifying a distance the probe tip moves vertically as the contact probe moves across the surface of the workpiece. A contact probe is limited in speed and only quantifies the roughness of the surface the contact probe has traversed.

Therefore, it would be desirable to have a method and apparatus that take into account at least some of the issues discussed above, as well as other possible issues.

SUMMARY

An embodiment of the present disclosure provides a surface roughness analysis system. The surface roughness analysis system comprises a number of wave generators, a number of wave sensors, and an ultrasonic analysis system configured to receive material mechanical parameters for a workpiece, determine incident surface wave signal parameters for a source signal to be sent by the number of wave generators, and determine a designated distance for a number of wave sensors from the number of wave generators such that the number of wave sensors receiving a surface wave of a threshold value indicates a surface roughness within a roughness threshold.

Another embodiment of the present disclosure provides a method of analyzing surface roughness of a workpiece. Material mechanical parameters of the workpiece are received. Signal parameters for a source signal to be sent into a workpiece are determined using the material mechanical parameters. A designated distance for a number of wave sensors from the number of wave generators is determined such that the number of wave sensors receiving a surface wave of a threshold value indicates a surface roughness within a roughness threshold.

Yet another embodiment of the present disclosure provides a method of analyzing surface roughness of a workpiece. Signal parameters for a source signal to be sent into a workpiece by a number of wave generators for analyzing the surface roughness of the workpiece are determined. A cut-off wavelength is determined using material mechanical parameters of the workpiece. The cut-off wavelength is a ratio of surface wavelength over incident wavelength. A designated distance for a number of wave sensors from the number of wave generators is determined using the cut-off wavelength such that the number of wave sensors receiving a surface wave of a threshold value indicates a surface roughness within a roughness threshold.

Another embodiment of the present disclosure provides a surface roughness analysis system. The surface roughness analysis system comprises an ultrasonic analysis system, a number of wave generators, a number of wave sensors, and a roughness evaluator. The ultrasonic analysis system is configured to receive material mechanical parameters for a workpiece, determine incident surface wave signal parameters for a source signal to be sent by the number of wave generators, and determine a designated distance for a number of wave sensors from the number of wave generators such that the number of wave sensors receiving a surface wave of a threshold value indicates a surface roughness within a roughness threshold. The number of wave generators is configured to send a source signal having the signal parameters into a workpiece. The number of wave sensors is positioned at least the designated distance from the number of wave generators. The roughness evaluator is configured to determine if the surface roughness of the workpiece is below a roughness threshold based on a surface wave sensed by number of wave sensors.

Another embodiment of the present disclosure provides a surface roughness analysis system. The surface roughness analysis system comprises a number of wave generators, a number of wave sensors, and a roughness evaluator. The number of wave generators is configured to send a source signal having signal parameters into a workpiece, the signal parameters are calculated to generate a surface wave in the workpiece. The number of wave sensors is oriented to receive surface waves from the workpiece and positioned at least a designated distance from the number of wave generators, wherein the designated distance is such that receiving a surface wave of a threshold value at the number of wave sensors indicates a surface roughness within a roughness threshold. The roughness evaluator is configured to determine if the surface roughness of the workpiece is below a roughness threshold based on a presence or absence of a surface wave sensed by number of wave sensors.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. The illustrative examples recognize and take into account that roughness is often a predictor for performance of mechanical components in both subtractive and additive manufacturing processes. The illustrative examples recognize and take into account that irregularities on a surface finish may form nucleation sites for cracks and corrosion. The illustrative examples recognize and take into account that fatigue is a surface phenomenon and high surface roughness can increase crack growth initiation possibility.

The illustrative examples recognize and take into account that roughness also plays a role in material interaction with the environment. For example, roughness affects corrosion.

The illustrative examples recognize and take into account that surface roughness can be a challenge in manufacturing of three-dimensionally printed parts. The illustrative examples recognize and take into account that many additive manufacturing methods construct a part's geometry by layered deposition of the material. Surface roughness can be especially important to high fatigue cycle components.

The illustrative embodiments use ultrasonic surface guided waves to characterize the surface roughness amplitude and frequency during the manufacturing process. Surface acoustic waves are produced by a number of transducers and propagate along a rough surface. The illustrative embodiments predefine a cut-off threshold for Rayleigh wave propagation, which is indicative of the surface roughness description. This cut-off occurs for a particular ratio of the spatial surface waviness and the acoustic wavelength, and the detection of the resulting wave attenuation and decay characterizes the surface roughness.

The illustrative embodiments can be used in-line with the production process. The illustrative embodiments could signal adjustment of the material deposition rate in additive manufacturing when indicated to achieve the desired product quality. The illustrative embodiments indicate when rework or additional surface processing is desirable.

Figure 1:
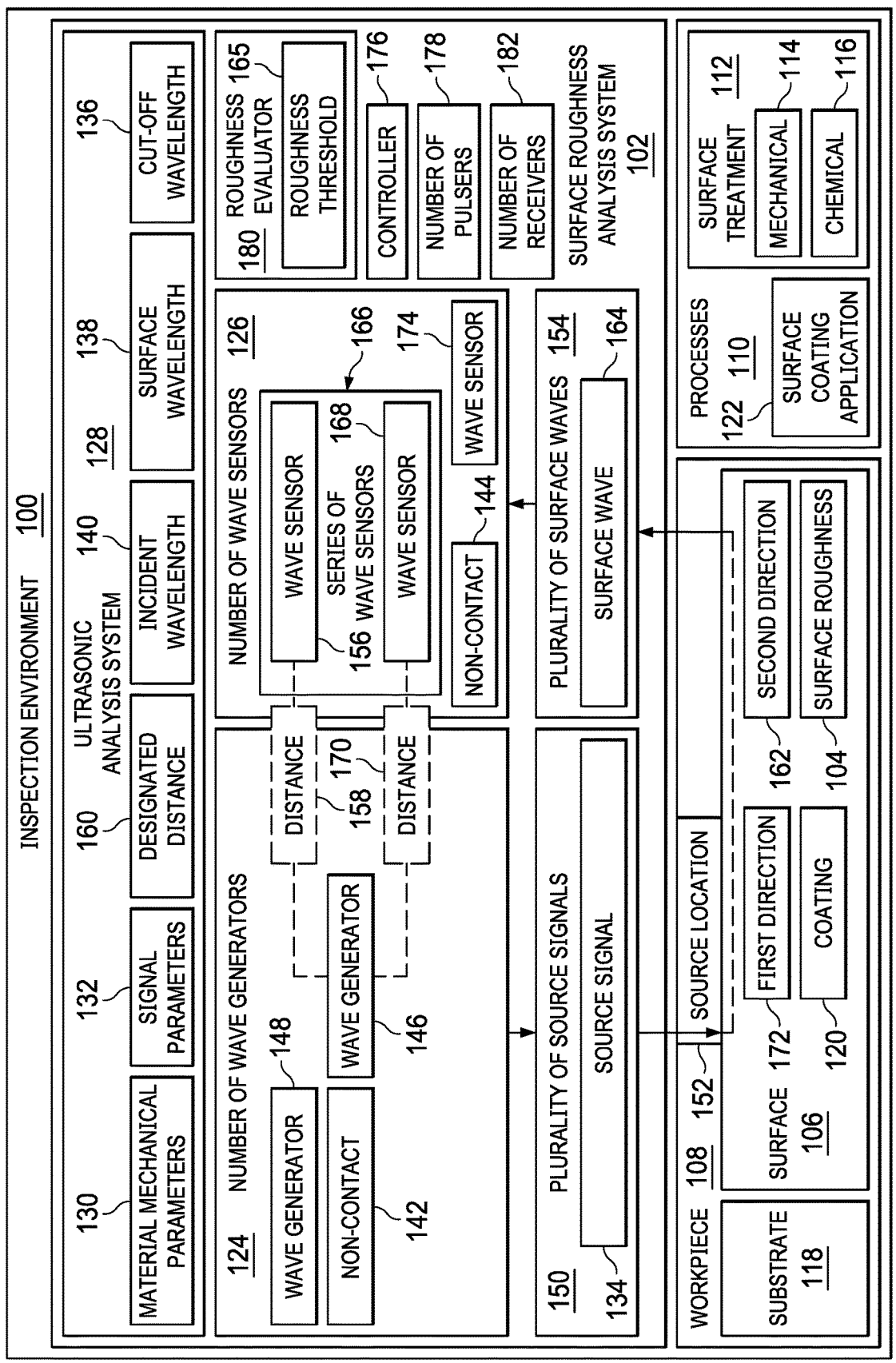
FIG. 1 is an illustration of a block diagram of an inspection environment in which an illustrative embodiment may be implemented.

Turning now to FIG. 1, an illustration of a block diagram of an inspection environment is depicted in which an illustrative embodiment may be implemented. In inspection environment 100, surface roughness analysis system 102 is used to analyze surface roughness 104 of surface 106 of workpiece 108. Surface roughness 104 can be due to processes 110 applied to workpiece 108. Processes 110 include any desirable type of manufacturing, maintenance, cleaning, operation, or other process. Processes 110 may be used to add or subtract material to workpiece 108.

In some illustrative examples, processes 110 include surface treatment 112. Surface treatment 112 affects surface roughness 104 of workpiece 108. Surface treatment 112 is selected from one of mechanical 114 or chemical 116. In some illustrative examples, mechanical 114 surface treatment 112 is selected from at least one of polishing, sanding, grinding, sand blasting, or any other desirable form of mechanical 114 surface treatment 112.

In some illustrative examples, when processes 110 include surface treatment 112 that affects surface roughness 104, surface 106 is part of substrate 118 of workpiece 108. In other illustrative examples, when processes 110 include surface treatment 112 that affects surface roughness 104, surface 106 is coating 120 over substrate 118. In some illustrative examples, coating 120 is applied directly over substrate 118. In other illustrative examples, intermediate layers are present between coating 120 and substrate 118.

In some illustrative examples, processes 110 include surface coating application 122. Surface coating application 122 includes adding any desirable thickness or type of material to workpiece 108. In some illustrative examples, surface coating application 122 includes one of painting, waxing, applying an anti-icing layer, applying a hydrophobic layer, applying a heat protective layer, or any other surface coating application 122.

In some illustrative examples, surface roughness analysis system 102 may be described as a pitch-catch ultrasonic roughness analysis system. In some illustrative examples, surface roughness analysis system 102 comprises number of wave generators 124, number of wave sensors 126, and ultrasonic analysis system 128. Ultrasonic analysis system 128 is configured to receive material mechanical parameters 130 for workpiece 108, determine signal parameters 132 for source signal 134 to be sent by number of wave generators 124, and determine designated distance 160 for number of wave sensors 126 from number of wave generators 124 such that number of wave sensors 126 receiving surface wave 164 of a threshold value indicates surface roughness 104 within roughness threshold 165. In some illustrative examples, ultrasonic analysis system 128 is further configured to determine cut-off wavelength 136 using material mechanical parameters 130, wherein cut-off wavelength 136 is a ratio of surface wavelength 138 over incident wavelength 140. Designated distance 160 is determined based on cut-off wavelength 136. In some illustrative examples, cut-off wavelength 136 is approximately 0.5.

A cut-off threshold for Rayleigh wave propagation exists, which is indicative of surface roughness 104. This cut-off wavelength 136 occurs for a particular ratio of surface wavelength 138 and incident wavelength 140. In some illustrative examples, this ratio is described as a ratio of the spatial surface waviness and the acoustic wavelength. Detection of the resulting wave attenuation and decay characterizes surface roughness 104. Surface roughness analysis system 102 can be used in-line with the production process. For additive manufacturing, surface roughness analysis system 102 can be used in-line to signal adjustment of the material deposition rate to achieve the desired surface roughness.

The Rayleigh wave propagates over the surface of solid media, such as surface 106 of workpiece 108, and gradually loses its energy due to surface roughness 104. A Rayleigh wave would have no discernable energy loss for an entirely smooth surface.

Attenuation of a surface wave, such as surface wave 164, is related to the surface profile parameters. A wave front on a rough surface decays by interference from the roughness pattern. The roughness profile and the magnitude of $R_{max}$ and λsurface can cause immediate or partial attenuation of a surface wave. If the height distance of $R_{max}/2$ is higher than a Rayleigh wavelength, then the surface wave will not form at all and the wave front reflects immediately. For the frequency spectrum ranging less than one wavelength where $R_{max} < \lambda_{surface}$, the surface wave forms and propagates but is eventually damped at a certain distance along the rough surface.

Cut-off wavelength 136 can be described as a ratio between surface wavelength 138 over incident wavelength 140, λsurface/λwave at which the Rayleigh wave does not form. The surface waves attenuate at any point beyond cut-off wavelength 136. The higher the magnitude of surface wavelength 138, λsurface, the greater the wave attenuation. There is total attenuation if the ratio is 0.1 and no attenuation if the ratio is 1. There is a partial attenuation of the Rayleigh wave in the range of 0.1<λsurface/λwave<1. The cut-off wavelength can be customized for different roughness profiles. In some illustrative examples, the cut-off threshold is when λsurface/λwave=0.5.

Number of wave generators 124 generates plurality of source signals 150 using signal parameters 132. Signal parameters 132 are determined by ultrasonic analysis system 128 and take into account material mechanical parameters 130 and cut-off wavelength 136.

Number of wave generators 124 includes any desirable quantity of wave generators. As used herein, "a number of," when used with reference to items, means one or more items. For example, "number of wave generators 124" includes one or more wave generators.

In some illustrative examples, number of wave generators 124 is acoustically coupled to surface 106 through contact with surface 106. In some illustrative examples, number of wave generators 124 is acoustically coupled to surface 106 through a coupling fluid. In some illustrative examples, number of wave generators 124 is non-contact 142.

Number of wave sensors 126 includes any desirable quantity of wave sensors. Number of wave sensors 126 includes one or more wave sensors.

In some illustrative examples, number of wave sensors 126 is acoustically coupled to surface 106 through contact with surface 106. In some illustrative examples, number of wave sensors 126 is acoustically coupled to surface 106 through a coupling fluid. In some illustrative examples, number of wave sensors 126 is non-contact 144.

When a surface wave, such as surface wave 164, is completely attenuated prior to number of wave sensors 126 or does not form, number of wave sensors 126 does not receive surface wave 164. Number of wave sensors 126 produce output of electrical signals indicative of any surface waves sensed by number of wave sensors 126. Output of number of wave sensors 126 above a signal threshold indicates detection of a surface wave. The signal threshold is set to differentiate signal from noise.

When surface wave 164 completely attenuates, number of wave sensors 126 does not sense surface wave 164. When number of wave sensors 126 does not sense surface wave 164, output of number of wave sensors 126 is below a signal threshold. Output of number of wave sensors 126 below a signal threshold indicates surface roughness 104 is outside of roughness threshold 165. Roughness threshold 165 is a predetermined level at which surface roughness 104 is undesirable for workpiece 108 and its intended use. For example, roughness threshold 165 is a predetermined maximum level based on a largest desirable roughness height or largest desirable roughness width. The largest desirable roughness height and largest desirable roughness width are based on a desired use, material, and part type of workpiece 108.

In some illustrative examples, number of wave generators 124 includes wave generator 146. In some illustrative examples, number of wave generators 124 includes wave generator 148. Number of wave generators 124 is configured to send plurality of source signals 150 into surface 106 of workpiece 108. Plurality of source signals 150 may be sent into surface 106 simultaneously or consecutively. Wave generator 146 sends source signal 134 into workpiece 108. Wave generator 146 sends source signal 134 into workpiece 108 at source location 152 of surface 106.

Number of wave sensors 126 is configured to sense plurality of surface waves 154 traveling through surface 106. Number of wave sensors 126 is positioned at least a designated distance from number of wave generators 124 to detect surface waves from workpiece 108, wherein designated distance 160 is selected based on cut-off wavelength 136 calculated by ultrasonic analysis system 128.

In some illustrative examples, number of wave sensors 126 includes only wave sensor 156 distance 158 from wave generator 146. When number of wave generators 124 has only wave generator 146 and number of wave sensors 126 has only wave sensor 156, distance 158 is at least designated distance 160. Distance 158 is measured in second direction 162 on surface 106 of workpiece 108. Designated distance 160 is selected based on cut-off wavelength 136 calculated by ultrasonic analysis system 128. Designated distance 160 is selected such that receiving a surface wave of a threshold value indicates a surface roughness within a roughness threshold 165.

When distance 158 between wave sensor 156 and wave generator 146 is at least designated distance 160, receiving surface wave 164 at wave sensor 156 indicates surface roughness 104 is within roughness threshold 165. In these illustrative examples, surface wave 164 is generated by source signal 134 sent into workpiece 108 at source location 152.

If wave sensor 156 senses surface wave 164, surface roughness 104 between wave generator 146 and wave sensors 156 is within roughness threshold 165. If wave sensor 156 does not sense surface wave 164, surface wave 164 has attenuated due to surface roughness 104 or not formed at all due to surface roughness 104. If wave sensor 156 does not sense surface wave 164, surface roughness 104 between wave generator 146 and wave sensors 156 is outside roughness threshold 165.

In some illustrative examples, number of wave sensors 126 comprises series of wave sensors 166. Each wave sensor of series of wave sensors 166 has a different distance from wave generator 146 of number of wave generators 124 in second direction 162 of surface 106 of workpiece 108. Series of wave sensors 166 include wave sensor 156 and wave sensor 168. Wave sensor 168 is distance 170 from wave generator 146. Distance 158 and distance 170 are different values.

Using a single wave sensor, such as wave sensor 156, surface roughness 104 of a single location is analyzed. Using series of wave sensors 166 in combination, different locations between wave generator 146 and series of wave sensors 166 can be evaluated.

In some illustrative examples, distance 158 is less than distance 170. In some illustrative examples, wave sensor 156 senses surface wave 164 and wave sensor 168 does not sense surface wave 164. In these illustrative examples, surface roughness 104 between wave sensor 156 and wave generator 146 is within roughness threshold 165. In these illustrative examples, surface roughness 104 between wave sensor 168 and wave sensor 156 is outside roughness threshold 165.

In some illustrative examples, neither wave sensor 156 nor wave sensor 168 sense surface wave 164. In these illustrative examples, surface roughness 104 between wave sensor 156 and wave generator 146 is outside of roughness threshold 165.

In some illustrative examples, both wave sensor 156 and wave sensor 168 sense surface wave 164. In these illustrative examples, surface roughness 104 between wave generator 146 and wave sensor 168 is within roughness threshold 165.

In some illustrative examples, number of wave generators 124 comprises a plurality of wave generators, wave generator 146 and wave generator 148, spaced across surface 106 of workpiece 108 in first direction 172. First direction 172 is perpendicular to second direction 162. In these illustrative examples, the plurality of wave generators sends plurality of source signals 150 into surface 106 in a plurality of source locations.

In some illustrative examples, wave sensor 156 is positioned at least designated distance 160 from wave generator 146 and wave sensor 174 is positioned at least designated distance 160 from wave generator 148. Using output from wave sensor 156 and wave sensor 174, localized surface roughness 104 in first direction 172 is analyzed. Output from wave sensor 156 is used to analyze surface roughness 104 between wave generator 146 and wave sensor 156. Output from wave sensor 174 is used to analyze surface roughness 104 between wave generator 148 and wave sensor 174.

Controller 176 is configured to control generation of plurality of source signals 150 having signal parameters 132 by number of wave generators 124. Controller 176 may be implemented in at least one of hardware or software. Controller 176 may be a processor unit in a computer system or a specialist circuit depending on the particular implementation.

In some illustrative examples, controller 176 is configured to send electrical control signals to number of pulsers 178. The electrical control signals instruct number of pulsers 178 which pulsing scheme to employ. In response to those electrical control signals, number of pulsers 178 outputs electrical signals representing the ultrasonic waves to be generated to number of wave generators 124.

Surface roughness analysis system 102 includes roughness evaluator 180 configured to determine if surface roughness 104 of workpiece 108 is below roughness threshold 165 based on surface waves sensed by number of wave sensors 126. Roughness evaluator 180 determines, from output of number of wave sensors 126, if surface roughness 104 is within roughness threshold 165. When a wave sensor of number of wave sensors 126 outputs a signal at or above a signal threshold, the wave sensor has detected a surface wave, such as surface wave 164. When roughness evaluator 180 receives output from number of wave sensors 126 that below signal threshold, roughness evaluator 180 determines that surface roughness 104 is outside of roughness threshold 165.

Number of wave sensors 126 converts impinging ultrasonic waves into electrical signals. In some illustrative examples, these electrical signals are sent to number of receivers 182. In these illustrative examples, number of receivers 182 outputs electrical signals representing the acquired ultrasonic inspection data from number of wave sensors 126 to roughness evaluator 180.

In some illustrative examples, surface roughness analysis system 102 comprises ultrasonic analysis system 128 configured to receive material mechanical parameters 130 for workpiece 108, determine incident surface wave signal parameters 132 for a source signal 134 to be sent by a number of wave generators 124, and determine a designated distance 160 for a number of wave sensors 126 from the number of wave generators 124 such that the number of wave sensors 126 receiving a surface wave 164 of a threshold value indicates a surface roughness 104 within roughness threshold 165; number of wave generators 124 configured to send a source signal having signal parameters 132 into a workpiece; number of wave sensors 126 positioned at least designated distance 160 from number of wave generators 124; and roughness evaluator 180 configured to determine if surface roughness 104 of workpiece 108 is below a roughness threshold 165 based on a surface wave 164 sensed by number of wave sensors 126.

In some illustrative examples, surface roughness analysis system 102 comprises number of wave generators 124 configured to send source signal 134 having signal parameters 132 into workpiece 108, signal parameters 132 calculated to generate surface wave 164 in workpiece 108; number of wave sensors 126 is oriented to receive surface waves 154 from workpiece 108 and positioned at least designated distance 160 from the number of wave generators 124, wherein designated distance 160 is such that receiving surface wave 164 of a threshold value at number of wave sensors 126 indicates a surface roughness 104 within roughness threshold 165; and roughness evaluator 180 is configured to determine if surface roughness 104 of workpiece 108 is below roughness threshold 165 based on a presence or absence of surface wave 164 sensed by number of wave sensors 126.

The illustrations of surface roughness analysis system 102 and inspection environment 100 in FIG. 1 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although number of wave generators 124 is only discussed as having one or two wave generators, number of wave generators 124 can have any desirable quantity of wave generators. For example, number of wave generators 124 can have more than two wave generators.

As another example, although series of wave sensors 166 is discussed as associated with wave generator 146, in some illustrative examples number of wave generators 124 has more than one wave generator, each associated with its own series of wave sensors. As yet another example, although series of wave sensors 166 is depicted as only having two wave sensors, in some illustrative examples series of wave sensors 166 has more than two wave sensors.

As another example, although controller 176 is shown as a separate component from ultrasonic analysis system 128, in some non-depicted examples, ultrasonic analysis system 128 and controller 176 are part of the same processor unit or computer system. As yet another example, although controller 176 is shown as a separate component from roughness evaluator 180, in some non-depicted examples, roughness evaluator 180 and controller 176 are part of the same processor unit or computer system.

Figure 2:
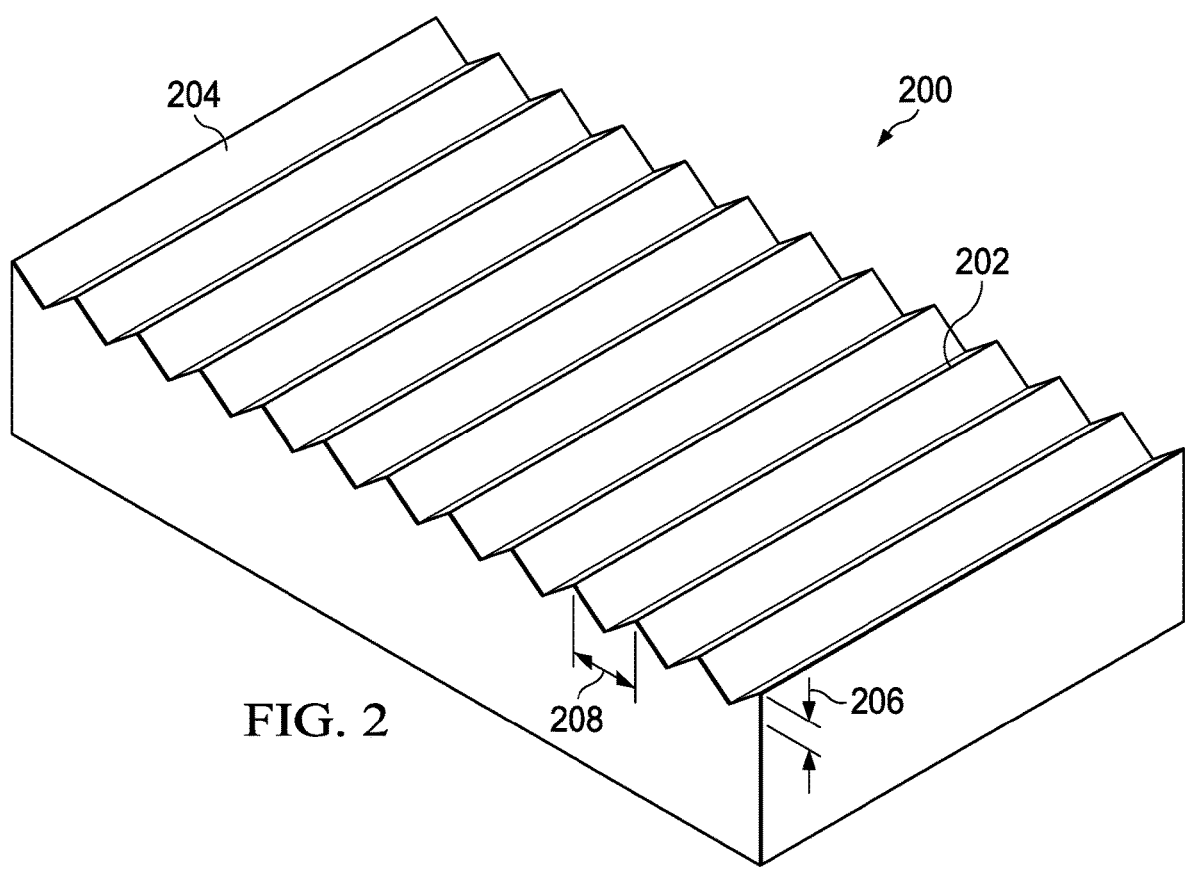
FIG. 2 is a perspective view of a workpiece having a surface roughness in accordance with an illustrative embodiment.

Turning now to FIG. 2, a perspective view of a workpiece having a surface roughness is depicted in accordance with an illustrative embodiment. Workpiece 200 is a physical implementation of workpiece 108 of FIG. 1. Surface roughness analysis system 102 of FIG. 1 can be used to analyze surface roughness 202 of workpiece 200.

Workpiece 200 has surface 204 with surface roughness 202. Surface roughness 202 has roughness height 206 and roughness width 208.

Surface roughness 202 consists of surface irregularities which result from manufacturing processes. These irregularities combine to form surface texture and are illustrated in FIG. 2. Roughness width 208 is the distance parallel to the nominal surface between the successive peaks or ridges constituting the predominant pattern roughness. Roughness height 206 is sometimes also known as the height of unevenness. Roughness height 206 is the height of the irregularities with respect to a reference mean-line.

Roughness lay 210 represents the direction of predominant surface pattern produced and it reflects the manufacturing operation used to produce it. "Waviness" refers to widely spaced irregularities outside the roughness width cut off values, and which may be the result of work piece or tool deflection during machining, vibration, or tool run-out. Waviness height is the peak to valley distance of the surface profile, measured in millimeters.

Figure 3:
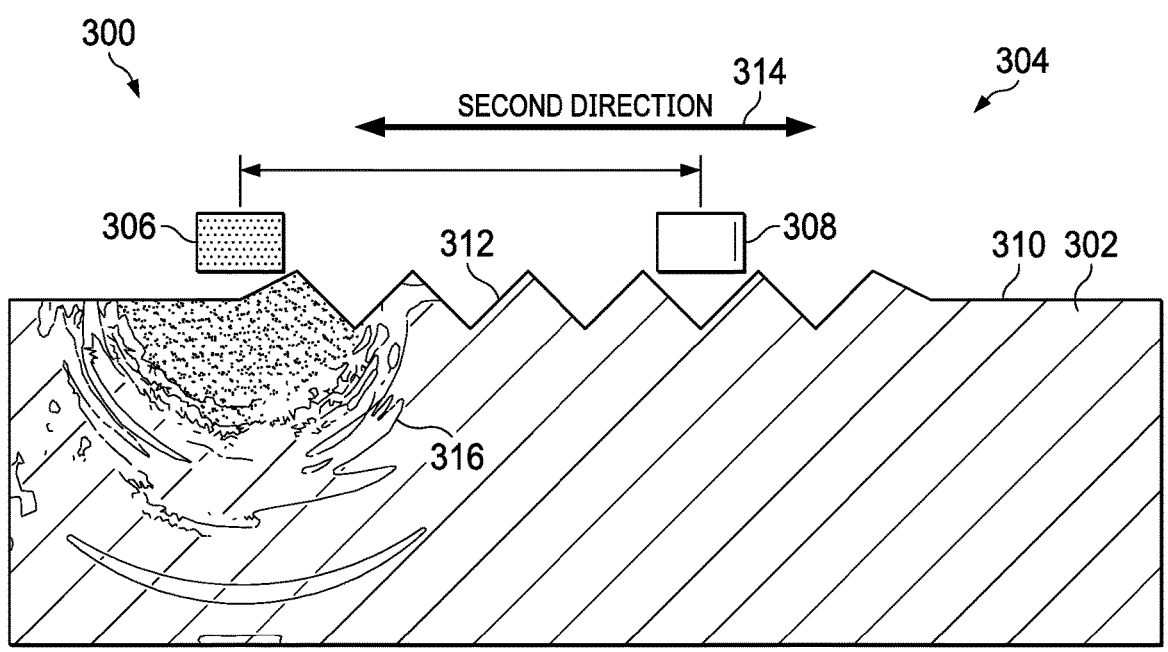
FIG. 3 is a side view of a workpiece with components of a surface roughness analysis system associated with a surface of the workpiece in accordance with an illustrative embodiment.

Turning now to FIG. 3, a cross-sectional side view of a workpiece with components of a surface roughness analysis system associated with a surface of the workpiece is depicted in accordance with an illustrative embodiment. Components of surface roughness analysis system 300 are associated with workpiece 302. Surface roughness analysis system 300 is a physical implementation of surface roughness analysis system 102 of FIG. 1. Workpiece 302 can be a physical implementation of workpiece 108 of FIG. 1. In some illustrative examples, view 304 is a cross-sectional view of workpiece 200.

Components of surface roughness analysis system 300 include wave generator 306 and wave sensor 308. Wave generator 306 is acoustically coupled to surface 310 of workpiece 302. Wave sensor 308 is acoustically coupled to surface 310 of workpiece 302 to detect surface waves from workpiece 302.

In some illustrative examples, wave generator 306 is acoustically coupled to surface 310 through contact with surface 310. In some illustrative examples, wave generator 306 is acoustically coupled to surface 310 through a coupling fluid. In some illustrative examples, wave generator 306 is a non-contact ultrasonic wave generator.

Wave generator 306 sends source signals having signal parameters into surface 310 of workpiece 302. The signal parameters are determined by an ultrasonic analysis system and take into account material mechanical parameters of workpiece 302.

In some illustrative examples, wave sensor 308 is acoustically coupled to surface 310 through contact with surface 310. In some illustrative examples, wave sensor 308 is acoustically coupled to surface 310 through a coupling fluid. In some illustrative examples, wave sensor 308 is a non-contact ultrasonic wave sensor.

Surface 310 has surface roughness 312. As depicted, surface roughness 312 disrupts propagation of surface waves along surface 310 of workpiece 302. Surface roughness 312 can cause immediate or partial attenuation of a wave.

Wave sensor 308 is positioned at least a designated distance from wave generator 306 in second direction 314. The designated distance is selected based on a cut-off wavelength calculated by an ultrasonic analysis system. The designated distance is selected such that receiving a surface wave within a threshold value indicates an acceptable surface roughness. The designated distance is a distance at which a surface wave would not propagate if surface roughness 312 is outside of a roughness threshold.

Source signals having signal parameters sent by wave generator 306 into surface 310 of workpiece 302 generate Rayleigh wave propagation 316. In view 304, Rayleigh wave propagation 316 is illustrated. Rayleigh wave propagation 316 emanates from a source location where a source signal sent by wave generator 306 enters surface 310. In view 304, a surface wave does not propagate to wave sensor 308 from Rayleigh wave propagation 316 due to surface roughness 312. Surface roughness 312 has at least one of an undesirable roughness width or undesirable roughness height.

As a surface wave does not propagate to wave sensor 308 from Rayleigh wave propagation 316, a signal having a sufficient strength is not received by wave sensor 308. In view 304, wave sensor 308 does not receive a signal.

Data output from wave sensor 308 is directed to an associated roughness evaluator (not depicted). In some illustrative examples, a receiver (not depicted) outputs electrical signals representing the acquired ultrasonic inspection data from wave sensor 308 to a roughness evaluator (not depicted). When wave sensor 308 does not receive a signal, an associated roughness evaluator determines surface 310 has surface roughness 312 outside of a roughness threshold.

Figure 4:
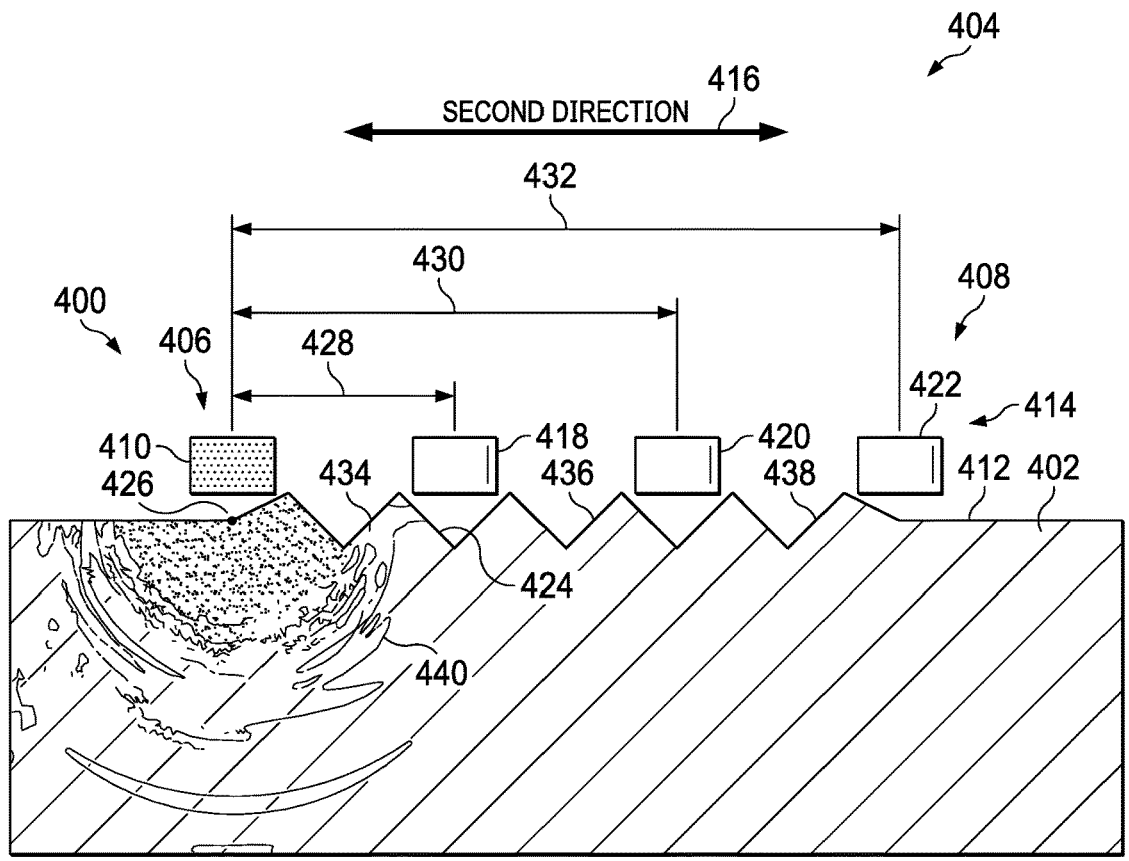
FIG. 4 is a side view of a workpiece with components of a surface roughness analysis system associated with a surface of the workpiece in accordance with an illustrative embodiment.

Turning now to FIG. 4, a cross-sectional side view of a workpiece with components of a surface roughness analysis system associated with a surface of the workpiece is depicted in accordance with an illustrative embodiment. Surface roughness analysis system 400 is a physical implementation of surface roughness analysis system 102 of FIG. 1. Workpiece 402 can be a physical implementation of workpiece 108 of FIG. 1. In some illustrative examples, view 404 is a cross-sectional view of workpiece 200.

Components of surface roughness analysis system 400 include number of wave generators 406 and number of wave sensors 408. Number of wave generators 406 has only one wave generator, wave generator 410. Wave generator 410 is acoustically coupled to surface 412 of workpiece 402.

Number of wave sensors 408 comprises series of wave sensors 414, each wave sensor of series of wave sensors 414 having a different distance from wave generator 410 of number of wave generators 406 in second direction 416 of surface 412 of workpiece 402. Number of wave sensors 408 includes wave sensor 418, wave sensor 420, and wave sensor 422.

Number of wave sensors 408 is acoustically coupled to surface 412 of workpiece 402 to detect surface waves from workpiece 402. Surface 412 has surface roughness 424. As depicted, surface roughness 424 disrupts propagation of surface waves along surface 412 of workpiece 402. Surface roughness 424 can cause immediate or partial attenuation of a wave.

In some illustrative examples, number of wave generators 406 is acoustically coupled to surface 412 through contact with surface 412. In some illustrative examples, number of wave generators 406 is acoustically coupled to surface 412 through a coupling fluid. In some illustrative examples, number of wave generators 406 is a number of non-contact ultrasonic wave generators.

Number of wave generators 406 sends source signals having signal parameters into surface 412 of workpiece 402. The signal parameters are determined by an ultrasonic analysis system and take into account material mechanical parameters of workpiece 402.

In some illustrative examples, at least one of number of wave sensors 408 is acoustically coupled to surface 412 through contact with surface 412. In some illustrative examples, at least one of number of wave sensors 408 is acoustically coupled to surface 412 through a coupling fluid. In some illustrative examples, at least one of number of wave sensors 408 is a non-contact ultrasonic wave sensor.

Wave generator 410 is positioned relative to workpiece 402 to send a source signal into workpiece 402 at source location 426. Number of wave sensors 408 is oriented relative to workpiece 402 such that number of wave sensors 408 is oriented to sense waves at at least two different distances from source location 426. In this illustrative example, number of wave sensors 408 is oriented to sense waves at three different distances from source location 426.

Each of number of wave sensors 408 is positioned a different distance from wave generator 410. Wave sensor 418 is distance 428 from wave generator 410. Wave sensor 420 is distance 430 from wave generator 410. Wave sensor 422 is distance 432 from wave generator 410.

In this illustrative example, determining if surface roughness 424 of workpiece 402 is within a roughness threshold comprises determining if surface roughness 424 in a plurality of locations of workpiece 402 is within a roughness threshold for at least one of roughness width or roughness height based on output of number of wave sensors 408.

By positioning number of wave sensors 408 different distances from wave generator 410, different locations of surface 412 in second direction 416 are analyzed. For example, surface roughness 424 in location 434 between wave generator 410 and wave sensor 418 is analyzed using data from wave sensor 418. If wave sensor 418 generates output indicative of a surface wave, surface roughness 424 in location 434 is within a roughness threshold. For example, output of wave sensor 418 above a signal threshold indicates detection of a surface wave. The signal threshold is set to differentiate signals from noise. When a surface wave propagates to wave sensor 418, surface roughness 424 is within a roughness threshold.

As another example, surface roughness 424 in location 436 between wave sensor 418 and wave sensor 420 is analyzed using data from wave sensor 420. If wave sensor 420 generates output indicative of a surface wave, surface roughness 424 in location 436 is within a roughness threshold. For example, output of wave sensor 420 above a signal threshold indicates detection of a surface wave. When a surface wave propagates to wave sensor 420, surface wave has propagated through location 434 and location 436. When a surface wave propagates to wave sensor 420, surface roughness 424 in location 434 and location 436 is within a roughness threshold.

As yet another example, surface roughness 424 in location 438 between wave sensor 420 and wave sensor 422 is analyzed using data from wave sensor 422. If wave sensor 422 generates output indicative of a surface wave, surface roughness 424 in location 438 is within a roughness threshold. For example, output of wave sensor 422 above a signal threshold indicates detection of a surface wave. When a surface wave propagates to wave sensor 422, the surface wave has propagated through location 434, location 436, and location 438. When a surface wave propagates to wave sensor 420, surface roughness 424 in location 434, location 436, and location 438 is within a roughness threshold. When a surface wave does not reach wave sensor 420, surface roughness 424 prior to wave sensor 420 can be outside a roughness threshold.

Using number of wave sensors 408 in combination can analyze surface roughness 424 in each of location 434, location 436, and location 438 individually. Using number of wave sensors 408 in combination can detect localized surface roughness 424 outside of a roughness threshold. For example, if a surface wave is detected at wave sensor 420 but a surface wave is not detected at wave sensor 422, surface roughness 424 in location 436 is within a roughness threshold but surface roughness 424 in location 438 is not within the roughness threshold. As another example, if a surface wave is detected at wave sensor 418 but a surface wave is not detected at wave sensor 420, surface roughness 424 in location 434 is within a roughness threshold but surface roughness 424 in location 436 is not within the roughness threshold. If a surface wave is not detected at wave sensor 418, surface roughness 424 in location 434 is outside a roughness threshold. If a surface wave is not detected at wave sensor 418, surface roughness 424 in location 436 and location 438 is not analyzed.

Number of wave sensors 408 is positioned at least a designated distance from the number of wave generators to detect surface waves from a workpiece, wherein the designated distance is selected based on a cut-off wavelength calculated by the ultrasonic analysis system. The designated distance is selected such that receiving a surface wave of a threshold value indicates an acceptable surface roughness.

Source signals having signal parameters sent by wave generator 406 into surface 412 of workpiece 402 generate Rayleigh wave propagation 440. In view 404, Rayleigh wave propagation 440 is illustrated. Rayleigh wave propagation 440 emanates from a source location where a source signal sent by wave generator 406 enters surface 412. In view 404, a surface wave does not propagate to any of wave sensor 418, wave sensor 420, or wave sensor 422 from Rayleigh wave propagation 440 due to surface roughness 424. Surface roughness 424 has at least one of an undesirable roughness width or undesirable roughness height.

Data output from number of wave sensors 408 is directed to an associated roughness evaluator (not depicted). In some illustrative examples, a number of receivers (not depicted) outputs electrical signals representing the acquired ultrasonic inspection data from number of wave sensors 408 to a roughness evaluator (not depicted). When a wave sensor of number of wave sensors 408 does not receive a signal, an associated roughness evaluator determines surface 412 has surface roughness 424 outside of a roughness threshold.

Figure 5:
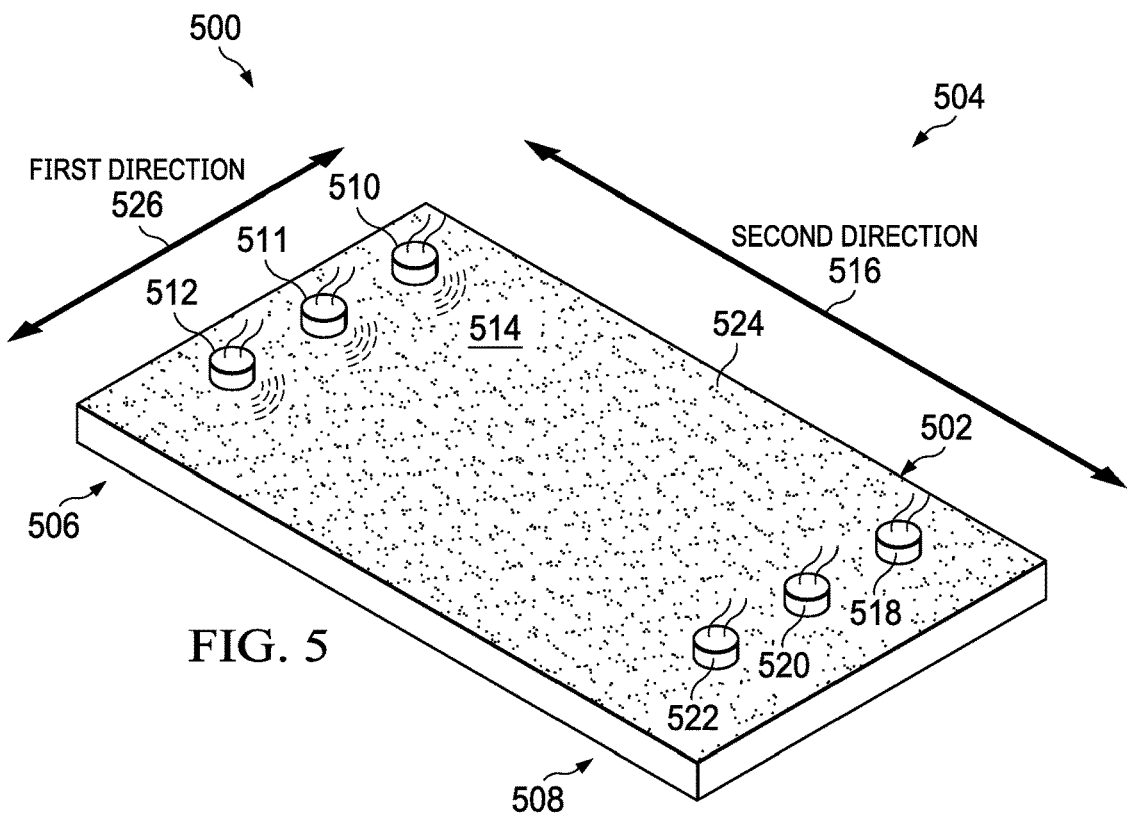
FIG. 5 is a perspective view of a workpiece with components of a surface roughness analysis system associated with a surface of the workpiece in accordance with an illustrative embodiment.

Turning now to FIG. 5, a perspective view of a workpiece with components of a surface roughness analysis system associated with a surface of the workpiece is depicted in accordance with an illustrative embodiment. Surface roughness analysis system 500 is a physical implementation of surface roughness analysis system 102 of FIG. 1. In some illustrative examples, workpiece 502 is a physical implementation of workpiece 108 of FIG. 1. In some illustrative examples, view 504 is a perspective view of workpiece 200. In some illustrative examples, view 504 is a perspective view of surface roughness analysis system 300 and workpiece 302 of FIG. 3.

Components of surface roughness analysis system 500 include number of wave generators 506 and number of wave sensors 508. Number of wave generators 506 includes wave generator 510, wave generator 511, and wave generator 512. Wave generator 510, wave generator 511, and wave generator 512 are acoustically coupled to surface 514 of workpiece 502.

In some illustrative examples, number of wave generators 506 is acoustically coupled to surface 514 through contact with surface 514. In some illustrative examples, number of wave generators 506 is acoustically coupled to surface 514 through a coupling fluid. In some illustrative examples, number of wave generators 506 is a number of non-contact ultrasonic wave generators.

In some illustrative examples, at least one of number of wave sensors 508 is acoustically coupled to surface 514 through contact with surface 514. In some illustrative examples, at least one of number of wave sensors 508 is acoustically coupled to surface 514 through a coupling fluid. In some illustrative examples, at least one of number of wave sensors 508 is a non-contact ultrasonic wave sensor.

Each wave sensor of number of wave sensors 508 is positioned at least a designated distance from one of number of wave generators 506 in second direction 516 of surface 514 of workpiece 502. Number of wave sensors 508 includes wave sensor 518, wave sensor 520, and wave sensor 522.

Number of wave sensors 508 is acoustically coupled to surface 514 of workpiece 502 to detect surface waves from workpiece 502. Surface 514 has surface roughness 524. Surface roughness 524 can disrupt propagation of surface waves along surface 514 of workpiece 502. Surface roughness 524 can cause immediate or partial attenuation of a wave.

Determining if surface roughness 524 of workpiece 502 is within a roughness threshold comprises determining if surface roughness 524 in each of a plurality of locations of workpiece 502 is within a roughness threshold. The determination is based on output of the number of wave sensors, wave sensor 518, wave sensor 520, and wave sensor 522.

Having wave sensor 518, wave sensor 520, and wave sensor 522 allows for analysis of surface roughness 524 at the plurality of locations. Wave sensor 518, wave sensor 520, and wave sensor 522 are separated from each other in first direction 526. In FIG. 5, the plurality of locations is spread across first direction 526.

Wave sensor 518 is positioned at least a designated distance from wave generator 510 in second direction 516 of surface 514 of workpiece 502 to detect surface waves from workpiece 502. The designated distance is selected based on cut-off wavelength calculated by the ultrasonic analysis system. The designated distance is selected such that receiving a surface wave of a threshold value indicates an acceptable surface roughness.

Wave sensor 520 is positioned at least a designated distance from wave generator 511 in second direction 516 of surface 514 of workpiece 502 to detect surface waves from workpiece 502. Wave sensor 522 is positioned at least a designated distance from wave generator 512 in second direction 516 of surface 514 of workpiece 502 to detect surface waves from workpiece 502.

Number of wave generators 506 is separated in first direction 526 of workpiece 502. In view 504, wave generator 510, wave generator 511, and wave generator 512 are equally spaced across first direction 526. In other illustrative examples, number of wave generators 506 has different spacing.

In this illustrative example, surface roughness analysis system 500 analyzes surface roughness 524 of surface 514 between number of wave generators 506 and number of wave sensors 508. As depicted, number of wave generators 506 and number of wave sensors 508 are separated by substantially all of surface 514 in second direction 516.

Figure 6:
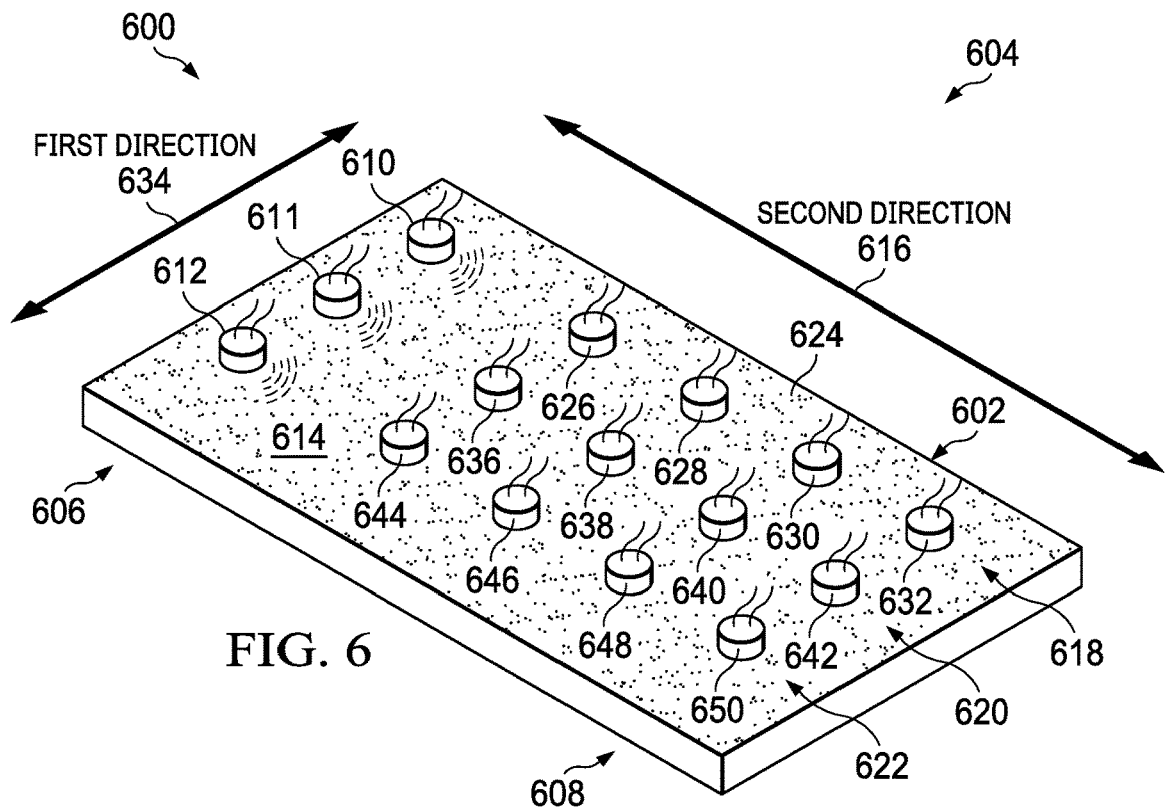
FIG. 6 is a perspective view of a workpiece with components of a surface roughness analysis system associated with a surface of the workpiece in accordance with an illustrative embodiment.

Turning now to FIG. 6, a perspective view of a workpiece with components of a surface roughness analysis system associated with a surface of the workpiece is depicted in accordance with an illustrative embodiment. Surface roughness analysis system 600 is a physical implementation of surface roughness analysis system 102 of FIG. 1. Workpiece 602 can be a physical implementation of workpiece 108 of FIG. 1. In some illustrative examples, view 604 is a perspective view of workpiece 200.

Components of surface roughness analysis system 600 include number of wave generators 606 and number of wave sensors 608. Number of wave generators 606 includes wave generator 610, wave generator 611, and wave generator 612. Wave generator 610, wave generator 611, and wave generator 612 are acoustically coupled to surface 614 of workpiece 602.

In some illustrative examples, number of wave generators 606 is acoustically coupled to surface 614 through contact with surface 614. In some illustrative examples, number of wave generators 606 is acoustically coupled to surface 614 through a coupling fluid. In some illustrative examples, number of wave generators 606 is a number of non-contact ultrasonic wave generators.

In some illustrative examples, at least one of number of wave sensors 608 is acoustically coupled to surface 614 through contact with surface 614. In some illustrative examples, at least one of number of wave sensors 608 is acoustically coupled to surface 614 through a coupling fluid. In some illustrative examples, at least one of number of wave sensors 608 is a non-contact ultrasonic wave sensor.

Each wave sensor of number of wave sensors 608 is positioned at least a designated distance from one of number of wave generators 606 in second direction 616 of surface 614 of workpiece 602. Number of wave sensors 608 includes series of wave sensors 618, series of wave sensors 620, and series of wave sensors 622.

Number of wave sensors 608 is acoustically coupled to surface 614 of workpiece 602 to detect surface waves from workpiece 602. Surface 614 has surface roughness 624. Surface roughness 624 can disrupt propagation of surface waves along surface 614 of workpiece 602. Surface roughness 624 can cause immediate or partial attenuation of a wave.

Series of wave sensors 618, series of wave sensors 620, and series of wave sensors 622 form network of wave sensors 625. Network of wave sensors 625 is spread across surface 614 to analyze surface roughness 624 of surface 614. Having network of wave sensors 625 allows for analysis of surface roughness 624 at a plurality of locations. Having network of wave sensors 625 allows for identifying localized surface roughness 624 outside of a roughness threshold. Having network of wave sensors 625 allows for analysis of surface roughness 624 at the plurality of locations. In FIG. 6, network of wave sensors 625 is spread in first direction 634 and second direction 616. In FIG. 6, the plurality of locations is spread across first direction 634 and second direction 616.

Series of wave sensors 618 is positioned a plurality of distances from wave generator 610 in second direction 616 to detect surface waves from workpiece 602. Series of wave sensors 618 includes wave sensor 626, wave sensor 628, wave sensor 630, and wave sensor 632.

By positioning series of wave sensors 618 different distances from wave generator 610, different locations of surface 614 in second direction 616 are analyzed. For example, surface roughness 624 in a location between wave generator 610 and wave sensor 626 is analyzed using data from wave sensor 626. If wave sensor 626 generates output indicative of a surface wave, surface roughness 624 in the location between wave generator 610 and wave sensor 626 is within a roughness threshold. For example, output of wave sensor 626 above a signal threshold indicates detection of a surface wave. The signal threshold is set to differentiate signal from noise. When a surface wave propagates to wave sensor 626, surface roughness 624 is within a roughness threshold.

As another example, surface roughness 624 in a location between wave sensor 626 and wave sensor 628 is analyzed using data from wave sensor 628. If wave sensor 628 generates output indicative of a surface wave, surface roughness 624 in the location between wave sensor 626 and wave sensor 628 is within a roughness threshold. For example, output of wave sensor 628 above a signal threshold indicates detection of a surface wave. When a surface wave propagates to wave sensor 628, surface wave has propagated through surface 614 between wave generator 610 and wave sensor 626 and then surface 614 between wave sensor 626 and wave sensor 628. When a surface wave propagates to wave sensor 628, surface roughness 624 between wave generator 610 and wave sensor 628 is within a roughness threshold.

As yet another example, surface roughness 624 in a location between wave sensor 628 and wave sensor 630 is analyzed using data from wave sensor 630. If wave sensor 630 generates output indicative of a surface wave, surface roughness 624 in the location is within a roughness threshold. For example, output of wave sensor 630 above a signal threshold indicates detection of a surface wave. When a surface wave propagates to wave sensor 630, a surface wave has propagated through surface 614 from wave generator 610 through a location between wave sensor 626 and wave generator 610, through the location between wave sensor 626 and wave sensor 628, and through the location between wave sensor 628 and wave sensor 630. When a surface wave propagates to wave sensor 630, surface roughness 624 between wave generator 610 and wave sensor 630 is within a roughness threshold. When a surface wave does not reach wave sensor 630, surface roughness 624 prior to wave sensor 630 can be outside a roughness threshold.

As yet another example, surface roughness 624 in a location between wave sensor 630 and wave sensor 632 is analyzed using data from wave sensor 632. If wave sensor 632 generates output indicative of a surface wave, surface roughness 624 in the location is within a roughness threshold. For example, output of wave sensor 632 above a signal threshold indicates detection of a surface wave. When a surface wave propagates to wave sensor 632, a surface wave has propagated through surface 614 from wave generator 610 through a location between wave sensor 626 and wave generator 610, through the location between wave sensor 626 and wave sensor 628, through the location between wave sensor 628 and wave sensor 630, and through the location between wave sensor 630 and wave sensor 632. When a surface wave propagates to wave sensor 632, surface roughness 624 between wave generator 610 and wave sensor 632 is within a roughness threshold. When a surface wave does not reach wave sensor 632, surface roughness 624 prior to wave sensor 632 can be outside a roughness threshold.

Using series of wave sensors 618 in combination can analyze surface roughness 624 in locations between wave sensors. Using series of wave sensors 618 in combination can detect localized surface roughness 624 outside of a roughness threshold.

Series of wave sensors 618, series of wave sensors 620, and series of wave sensors 622 are spaced apart in first direction 634. Series of wave sensors 618 is separated from series of wave sensors 620 in first direction 634. Series of wave sensors 620 is separated from series of wave sensors 622 in first direction 634.

Number of wave generators 606 is separated in first direction 634 of workpiece 602. In view 604, wave generator 610, wave generator 611, and wave generator 612 are equally spaced across first direction 634. In other illustrative examples, number of wave generators 606 has different spacing. Wave generator 610 is separated from wave generator 611 in first direction 634. Series of wave sensors 620 is positioned to sense surface waves generated from wave generator 611. Series of wave sensors 620 is positioned to sense surface waves at a plurality of locations between wave generator 610 and each of series of wave sensors 620.

A surface wave propagating across surface 614 from wave generator 611 will encounter wave sensor 636, wave sensor 638, wave sensor 640, and then wave sensor 642. In some illustrative examples, wave sensor 636 is positioned at least a designated distance from wave generator 611. The designated distance is selected based on cut-off wavelength calculated by the ultrasonic analysis system. The designated distance is selected such that receiving a surface wave of a threshold value indicates an acceptable surface roughness.

If a surface wave is received at wave sensor 636, surface roughness 624 between wave generator 611 and wave sensor 636 is within a roughness threshold. If a surface wave is received at subsequent wave sensors of series of wave sensors 620, each subsequent location is within a roughness threshold. For example, when wave sensor 638 receives a surface wave, the location between wave sensor 636 and wave sensor 638 has surface roughness 624 within a roughness threshold. As another example, when wave sensor 640 receives a surface wave, the location between wave sensor 638 and wave sensor 640 has surface roughness 624 within a roughness threshold. As yet another example, when wave sensor 642 receives a surface wave, the location between wave sensor 640 and wave sensor 642 has surface roughness 624 within a roughness threshold.

Series of wave sensors 620 is separated from series of wave sensors 622 in first direction 634. Series of wave sensors 622 is positioned to sense surface waves generated in surface 614 by wave generator 612. Wave sensors of series of wave sensors 622 is spread in second direction 616. Series of wave sensors 622 includes wave sensor 644, wave sensor 646, wave sensor 648, and wave sensor 650.

If a surface wave is received at wave sensor 644, surface roughness 624 between wave generator 612 and wave sensor 644 is within a roughness threshold. If a surface wave is received at subsequent wave sensors of series of wave sensors 622, each subsequent location is within a roughness threshold. For example, when wave sensor 646 receives a surface wave, the location between wave sensor 644 and wave sensor 646 has surface roughness 624 within a roughness threshold. As another example, when wave sensor 648 receives a surface wave, the location between wave sensor 646 and wave sensor 648 has surface roughness 624 within a roughness threshold. As yet another example, when wave sensor 650 receives a surface wave, the location between wave sensor 648 and wave sensor 650 has surface roughness 624 within a roughness threshold.

Figure 7:
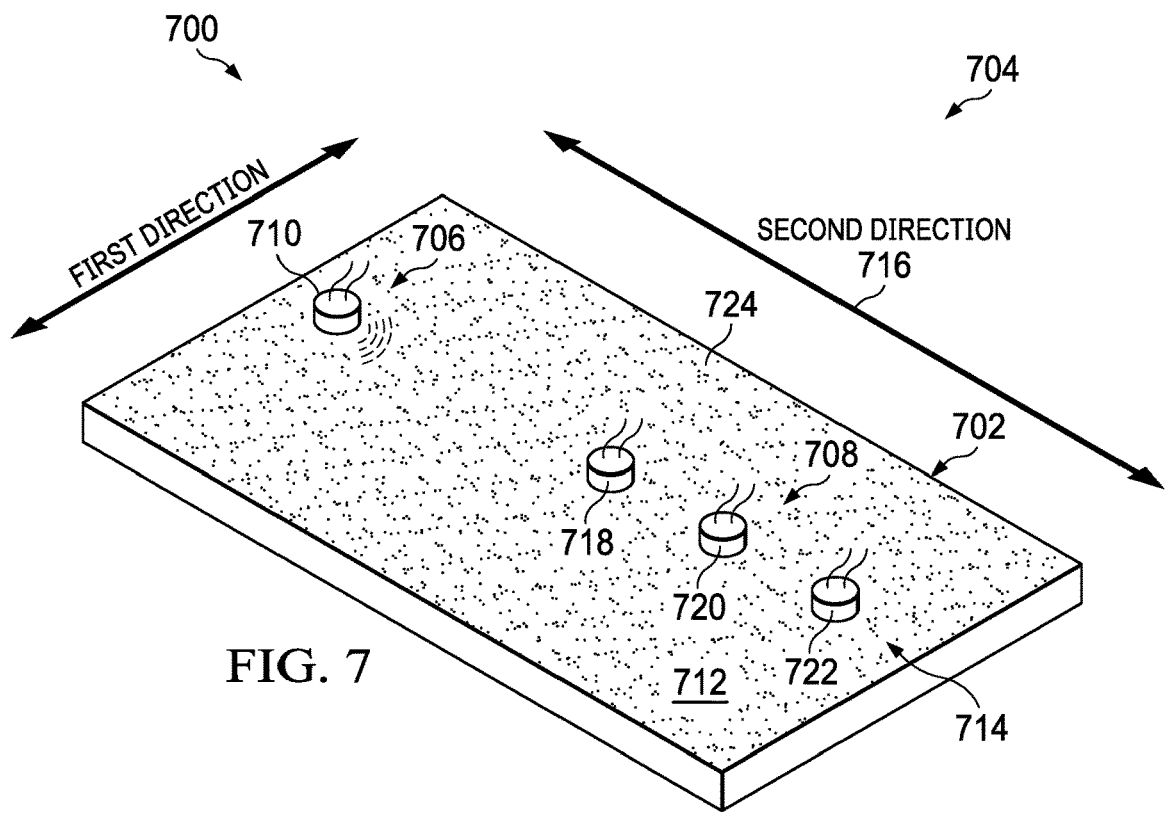
FIG. 7 is a perspective view of a workpiece with components of a surface roughness analysis system associated with a surface of the workpiece in accordance with an illustrative embodiment.

Turning now to FIG. 7, a perspective view of a workpiece with components of a surface roughness analysis system associated with a surface of the workpiece is depicted in accordance with an illustrative embodiment. Surface roughness analysis system 700 is a physical implementation of surface roughness analysis system 102 of FIG. 1. Workpiece 702 can be a physical implementation of workpiece 108 of FIG. 1. In some illustrative examples, view 704 is a perspective view of workpiece 200. In some illustrative examples, view 704 is a perspective view of surface roughness analysis system 400 and workpiece 402 of FIG. 4.

Components of surface roughness analysis system 700 include number of wave generators 706 and number of wave sensors 708. Number of wave generators 706 includes only one wave generator, wave generator 710. Wave generator 710 is acoustically coupled to surface 712 of workpiece 702.

Number of wave sensors 708 comprises series of wave sensors 714, each wave sensor of series of wave sensors 714 having a different distance from wave generator 710 of number of wave generators 706 in second direction 716 of surface 712 of workpiece 402. Number of wave sensors 708 includes wave sensor 718, wave sensor 720, and wave sensor 722. Each wave sensor of number of wave sensors 708 is positioned at least a designated distance from one of number of wave generators 706 in second direction 716 of surface 712 of workpiece 702. Number of wave sensors 708 includes wave sensor 718, wave sensor 720, and wave sensor 722.

Number of wave sensors 708 is acoustically coupled to surface 712 of workpiece 702 to detect surface waves from workpiece 702. Surface 712 has surface roughness 724. Surface roughness 724 can disrupt propagation of surface waves along surface 712 of workpiece 702. Surface roughness 724 can cause immediate or partial attenuation of a wave.

In some illustrative examples, number of wave generators 706 is acoustically coupled to surface 712 through contact with surface 712. In some illustrative examples, number of wave generators 706 is acoustically coupled to surface 712 through a coupling fluid. In some illustrative examples, number of wave generators 706 is a number of non-contact ultrasonic wave generators.

In some illustrative examples, at least one of number of wave sensors 708 is acoustically coupled to surface 712 through contact with surface 712. In some illustrative examples, at least one of number of wave sensors 708 is acoustically coupled to surface 712 through a coupling fluid. In some illustrative examples, at least one of number of wave sensors 708 is a non-contact ultrasonic wave sensor.

Wave sensor 718 is positioned at least a designated distance from wave generator 710 in second direction 716 of surface 712 of workpiece 702 to detect surface waves from workpiece 702. The designated distance is selected based on cut-off wavelength calculated by the ultrasonic analysis system. The designated distance is selected such that receiving a surface wave of a threshold value indicates an acceptable surface roughness.

Wave sensor 720 is positioned at least a designated distance from wave generator 710 in second direction 716 of surface 712 of workpiece 702 to detect surface waves from workpiece 702. Wave sensor 720 is farther away from wave generator 710 than wave sensor 718.

Wave sensor 722 is positioned at least a designated distance from wave generator 710 in second direction 716 of surface 712 of workpiece 702 to detect surface waves from workpiece 702. Wave sensor 722 is farther away from wave generator 710 than both wave sensor 718 and wave sensor 720.

By positioning number of wave sensors 708 different distances from wave generator 710, different locations of surface 712 in second direction 716 are analyzed. For example, surface roughness 724 in a location between wave generator 710 and wave sensor 718 is analyzed using data from wave sensor 718. If wave sensor 718 generates output indicative of a surface wave, surface roughness 724 in the location between wave generator 710 and wave sensor 718 is within a roughness threshold. For example, output of wave sensor 718 above a signal threshold indicates detection of a surface wave. The signal threshold is set to differentiate signals from noise. When a surface wave propagates to wave sensor 718, surface roughness 724 is within a roughness threshold.

As another example, surface roughness 724 in a location between wave sensor 718 and wave sensor 720 is analyzed using data from wave sensor 720. If wave sensor 720 generates output indicative of a surface wave, surface roughness 724 in the location between wave sensor 718 and wave sensor 720 is within a roughness threshold. For example, output of wave sensor 720 above a signal threshold indicates detection of a surface wave. When a surface wave propagates to wave sensor 720, the surface wave has propagated through surface 712 from wave generator 710 to wave sensor 720. When a surface wave propagates to wave sensor 720, surface roughness 724 between wave generator 710 and wave sensor 720 is within a roughness threshold. When a surface wave does not reach wave sensor 720, surface roughness 724 prior to wave sensor 720 can be outside a roughness threshold.

As yet another example, surface roughness 724 in a location between wave sensor 720 and wave sensor 722 is analyzed using data from wave sensor 722. If wave sensor 722 generates output indicative of a surface wave, surface roughness 724 in the location between wave sensor 720 and wave sensor 722 is within a roughness threshold. For example, output of wave sensor 722 above a signal threshold indicates detection of a surface wave. When a surface wave propagates to wave sensor 722, the surface wave has propagated through surface 712 from wave generator 710 to wave sensor 722. When a surface wave propagates to wave sensor 722, surface roughness 724 in locations between wave generator 710 and wave sensor 722 is within a roughness threshold. When a surface wave does not reach wave sensor 722, surface roughness 724 prior to wave sensor 722 can be outside a roughness threshold.

Using number of wave sensors 708 in combination can analyze surface roughness 724 in each respective location between each of the sensors individually. Using number of wave sensors 708 in combination can detect localized surface roughness 724 outside of a roughness threshold. For example, if a surface wave is detected at wave sensor 720 but a surface wave is not detected at wave sensor 722, surface roughness 724 in a location prior to wave sensor 720 is within a roughness threshold but surface roughness 724 in a location between wave sensor 720 and wave sensor 722 is not within the roughness threshold. As another example, if a surface wave is detected at wave sensor 718 but a surface wave is not detected at wave sensor 720, surface roughness 724 in a location prior to wave sensor 718 is within a roughness threshold but surface roughness 724 in a location between wave sensor 718 and wave sensor 720 is not within the roughness threshold. If a surface wave is not detected at wave sensor 718, surface roughness 724 in a location between wave generator 710 and wave sensor 718 is outside a roughness threshold. If a surface wave is not detected at wave sensor 718, surface roughness 724 in the locations after wave sensor 718 is not analyzed.

Figure 8:
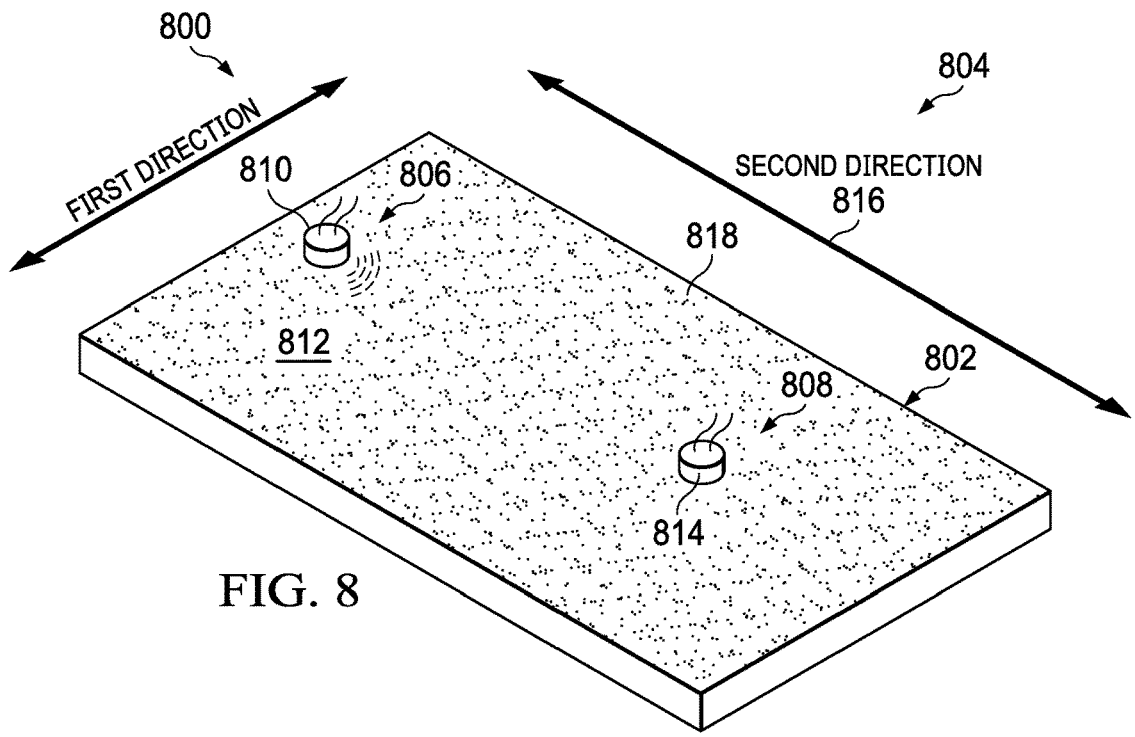
FIG. 8 is a perspective view of a workpiece with components of a surface roughness analysis system associated with a surface of the workpiece in accordance with an illustrative embodiment.

Turning now to FIG. 8, a perspective view of a workpiece with components of a surface roughness analysis system associated with a surface of the workpiece is depicted in accordance with an illustrative embodiment. Surface roughness analysis system 800 is a physical implementation of surface roughness analysis system 102 of FIG. 1. Workpiece 802 can be a physical implementation of workpiece 108 of FIG. 1. In some illustrative examples, view 804 is a perspective view of workpiece 200. In some illustrative examples, view 804 is a perspective view of surface roughness analysis system 300 and workpiece 302 of FIG. 3.

Components of surface roughness analysis system 800 include number of wave generators 806 and number of wave sensors 808. Number of wave generators 806 includes only one wave generator, wave generator 810. Wave generator 810 is acoustically coupled to surface 812 of workpiece 802.

Number of wave sensors 808 comprises only one wave sensor, wave sensor 814. Wave sensor 814 is positioned at least a designated distance from wave generator 810 in second direction 816 of surface 812 of workpiece 802. The designated distance is selected based on a cut-off wavelength calculated by the ultrasonic analysis system. The designated distance is selected such that receiving a surface wave of a threshold value indicates an acceptable surface roughness.

Number of wave sensors 808 is acoustically coupled to surface 812 of workpiece 802 to detect surface waves from workpiece 802. Surface 812 has surface roughness 818. Surface roughness 818 can disrupt propagation of surface waves along surface 812 of workpiece 802. Surface roughness 818 can cause immediate or partial attenuation of a wave.

In some illustrative examples, number of wave generators 806 is acoustically coupled to surface 812 through contact with surface 812. In some illustrative examples, number of wave generators 806 is acoustically coupled to surface 812 through a coupling fluid. In some illustrative examples, number of wave generators 806 is a number of non-contact ultrasonic wave generators.

In some illustrative examples, at least one of number of wave sensors 808 is acoustically coupled to surface 812 through contact with surface 812. In some illustrative examples, at least one of number of wave sensors 808 is acoustically coupled to surface 812 through a coupling fluid. In some illustrative examples, at least one of number of wave sensors 808 is a non-contact ultrasonic wave sensor.

In view 804, wave generator 810 and wave sensor 814 are used to analyze surface roughness 818 of the whole of surface 812. In view 804, wave sensor 814 is separated from wave generator 810 by more than half of surface 812 in second direction 816.

The illustrations of surface roughness analysis system 300 in FIG. 3, surface roughness analysis system 400 in FIG. 4, surface roughness analysis system 500 in FIG. 5, and surface roughness analysis system 600 in FIG. 6, surface roughness analysis system 700 in FIG. 7, and surface roughness analysis system 800 in FIG. 8 are not meant to imply physical or architectural limitations to the manner in which an illustrative embodiment may be implemented. Other components in addition to or in place of the ones illustrated may be used. Some components may be unnecessary. For example, a number of wave generators in any of the surface roughness analysis systems is only illustrative. A number of wave generators includes any desirable quantity of wave generators positioned relative to a workpiece at any desirable locations and in any desirable pattern to send at least one source signal into the workpiece. As another example, a number of wave sensors in any of the surface roughness analysis systems is only illustrative. A number of wave sensors includes any desirable quantity of wave sensors positioned relative to a workpiece at any desirable locations and in any desirable pattern to sense surface waves in the workpiece.

Figure 9:
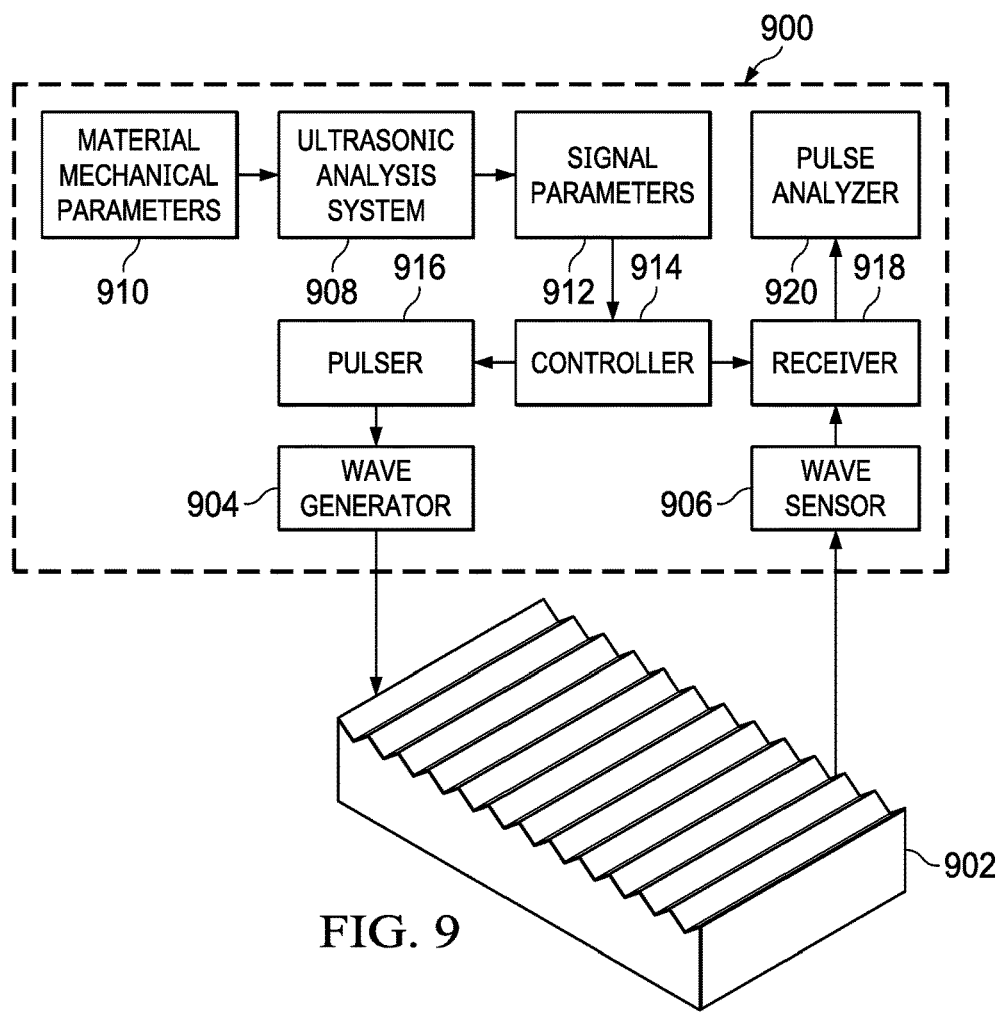
FIG. 9 is a block diagram of surface roughness analysis system associated with a surface of a workpiece in accordance with an illustrative embodiment.

Turning now to FIG. 9, a block diagram of surface roughness analysis system associated with a surface of a workpiece is depicted in accordance with an illustrative embodiment. Surface roughness analysis system 900 is a representation of surface roughness analysis system 102 of FIG. 1. Surface roughness analysis system 900 can be used to analyze workpiece 200 of FIG. 2. Workpiece 902 could be the same as workpiece 200 of FIG. 2. Surface roughness analysis system 900 includes wave generator 904 and wave sensor 906. In some illustrative examples, wave generator 904 is a representation of wave generator 306 and wave sensor 906 is a representation of wave sensor 308 of FIG. 3. In some illustrative examples, wave generator 904 is a representation of wave generator 410 of FIG. 4 and wave sensor 906 is representative of one of wave sensor 418, wave sensor 420, or wave sensor 422 of FIG. 4. In some illustrative examples, wave generator 904 is a representation of one of number of wave generators 506 of FIG. 5 and wave sensor 906 is representative of one of number of wave sensors 508 of FIG. 5. In some illustrative examples, wave generator 904 is a representation of one of number of wave generators 606 of FIG. 6 and wave sensor 906 is representative of one of number of wave sensors 608 of FIG. 6. In some illustrative examples, wave generator 904 is a representation of one of number of wave generators 706 of FIG. 7 and wave sensor 906 is representative of one of number of wave sensors 708 of FIG. 7. In some illustrative examples, wave generator 904 is a representation of one of number of wave generators 806 of FIG. 8 and wave sensor 906 is representative of one of number of wave sensors 808 of FIG. 8.

Wave generator 904 is acoustically coupled to workpiece 902. In some illustrative examples, wave generator 904 is acoustically coupled to workpiece 902 through contact with workpiece 902. In some illustrative examples, wave generator 904 is acoustically coupled to workpiece 902 through a coupling fluid. In some illustrative examples, wave generator 904 is a non-contact ultrasonic wave generator.

Wave generator 904 sends source signals having signal parameters into surface 310 of workpiece 302 of FIG. 3. The signal parameters are determined by an ultrasonic analysis system and take into account material mechanical parameters of workpiece 302.

Wave sensor 906 is acoustically coupled to workpiece 902. In some illustrative examples, wave sensor 906 is acoustically coupled to workpiece 902 through contact with workpiece 902. In some illustrative examples, wave sensor 906 is acoustically coupled to workpiece 902 through a coupling fluid. In some illustrative examples, wave sensor 906 is a non-contact ultrasonic wave sensor.

In FIG. 9, ultrasonic analysis system 908 receives material mechanical parameters 910 for workpiece 902. Ultrasonic analysis system 908 determines signal parameters 912 for simulating Rayleigh wave propagation within workpiece 902. Ultrasonic analysis system 908 sends signal parameters 912 to controller 914.

Controller 914 is configured to send electrical control signals to pulser 916. In response to those control signals, pulser 916 outputs electrical signals representing the ultrasonic waves to be generated to wave generator 904. Wave generator 904 may comprise one or more ultrasonic transducer elements. Wave generator 904 transduces the electrical signals from pulser 916 into ultrasonic waves. More specifically, the electrical signals sent to pulser 916 are configured to cause pulser 916 to generate a burst of ultrasonic waves having wave characteristics which are the same or similar to the wave characteristics of the simulated ultrasonic waves used in the simulation. In some illustrative examples, wave generator 904 may be excited using a sinusoidal signal.

Wave generator 904 is acoustically coupled to workpiece 902. Wave generator 904 is activated to generate ultrasonic waves that propagate through the material of workpiece 902.

Wave sensor 906 is also acoustically coupled to workpiece 902, but at a different location. Wave sensor 906 may comprise one or more ultrasonic transducer elements. The distance traveled by the Rayleigh wave as it propagates from wave generator 904 to wave sensor 906 is selected such that the distance is equal to or greater than a designated distance. The designated distance is selected based on cut-off wavelength calculated by the ultrasonic analysis system. The cut-off wavelength is a ratio of surface wavelength over incident wavelength Wave sensor 906 converts impinging ultrasonic waves into electrical signals which are sent to receiver 918. Receiver 918 receives electrical signals from controller 914 representing the source signal transmitted by wave generator 904. Receiver 918 in turn outputs electrical signals representing the acquired ultrasonic inspection data to the roughness evaluator 920.

Roughness evaluator 920 is a computer system configured to analyze the acquired ultrasonic inspection data from wave sensor 906 and determine if a surface roughness of workpiece 902 is within a roughness threshold. Roughness evaluator 920 is configured to compare the data from wave sensor 906 to a signal threshold. The signal threshold is set to differentiate signals from noise. In some illustrative examples, roughness evaluator 920 is configured to generate a flag in response to the surface roughness being outside the roughness threshold. The flag may be any one of the following: an analog signal, a digital code, a report, a notice, an alert, or a warning. The flag may be displayed on a display device. In the alternative, the flag may take the form of an aural alert.

Figure 10A:
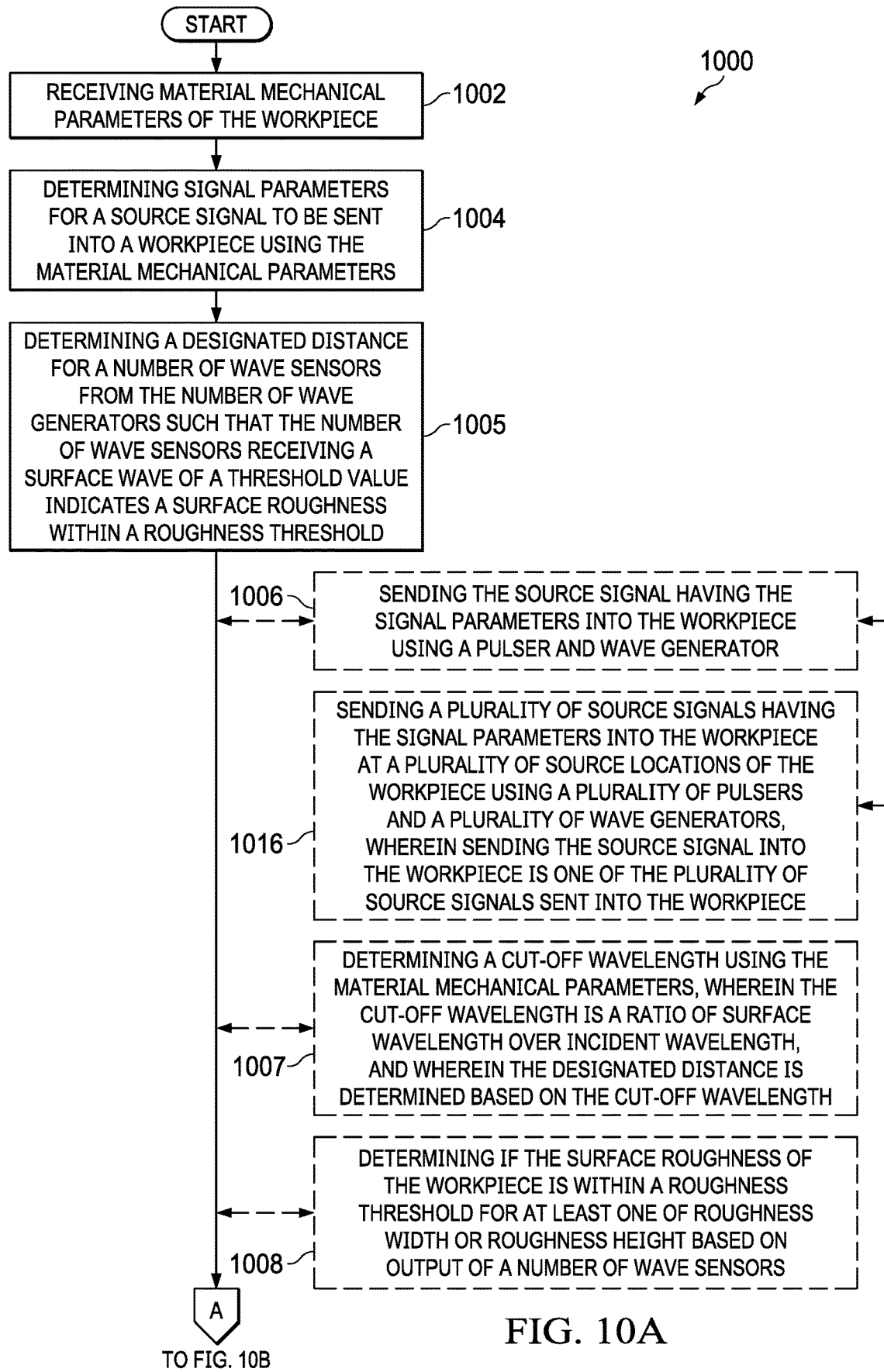
FIGS. 10A and 10B are an illustration of a flowchart of a method of analyzing surface roughness of a workpiece in accordance with an illustrative embodiment.
Figure 10B:
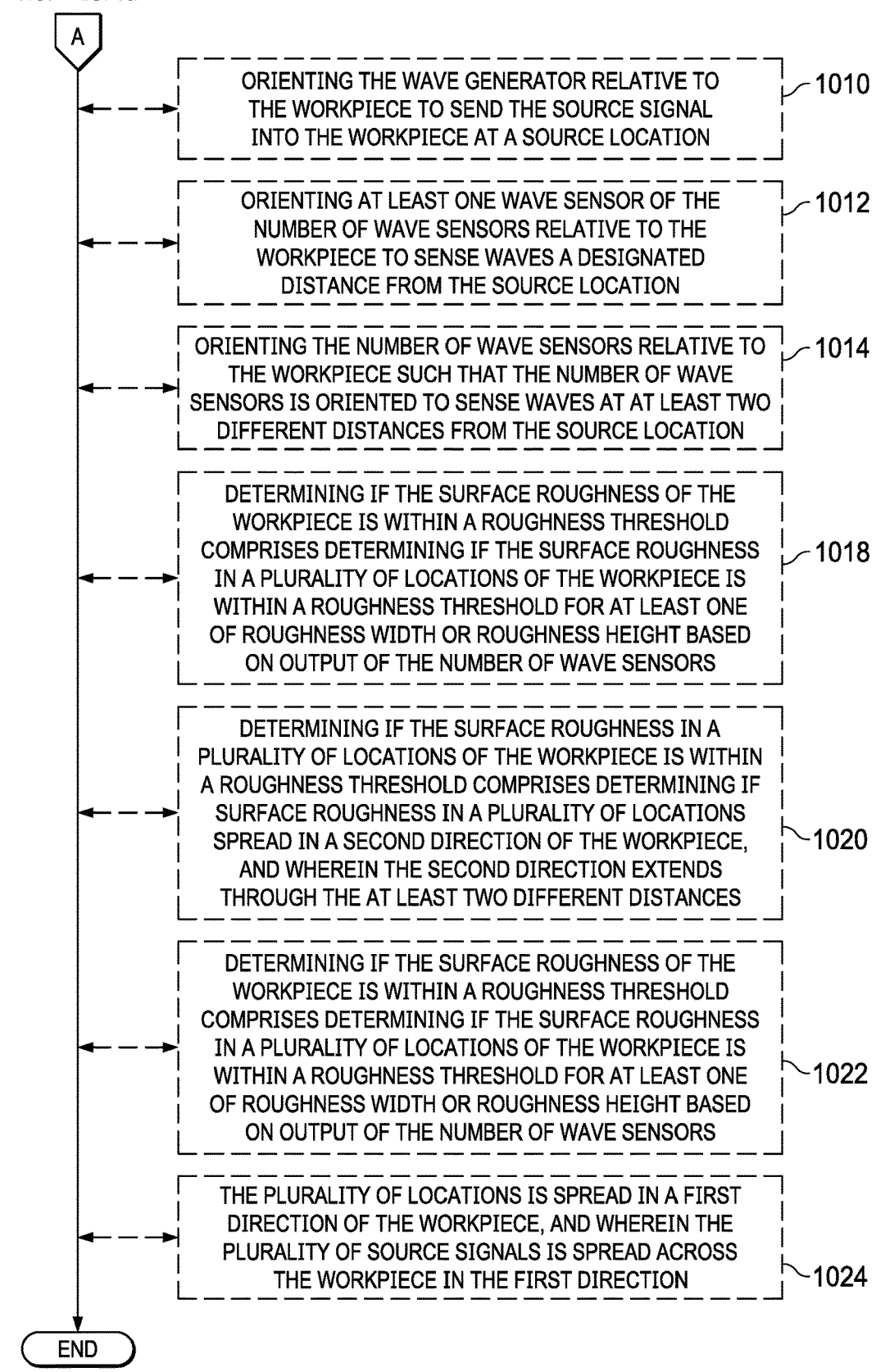

Turning now to FIGS. 10A and 10B, an illustration of a flowchart of a method of analyzing surface roughness of a workpiece is depicted in accordance with an illustrative embodiment. Method 1000 can be implemented using surface roughness analysis system 102 of FIG. 1. Method 1000 can be used to analyze surface roughness 104 of surface 106 of workpiece 108 of FIG. 1. Method 1000 can be used to analyze surface roughness 202 of surface 204 of workpiece 200 in FIG. 2. Method 1000 can be used to analyze surface roughness 312 of workpiece 302 of FIG. 3. Method 1000 can be used to analyze surface roughness 424 of workpiece 402 of FIG. 4. Method 1000 can be implemented used to analyze surface roughness 524 of workpiece 502 of FIG. 5. Method 1000 can be used to analyze surface roughness 624 of workpiece 602 of FIG. 6. Method 1000 can be used to analyze surface roughness 724 of workpiece 702 of FIG. 7. Method 1000 can be used to analyze surface roughness 818 of workpiece 802 of FIG. 8. Method 1000 can be implemented using surface roughness analysis system 900 to analyze a surface roughness of workpiece 902 of FIG. 9.

Method 1000 receives material mechanical parameters of the workpiece (operation 1002). Material mechanical parameters include any desirable material mechanical parameters, such as shear modulus, density, elastic modulus, or any other desirable material mechanical parameters. Method 1000 determines signal parameters for a source signal to be sent into a workpiece using the material mechanical parameters (operation 1004). To determine the signal parameters, effective wave propagation is determined using the material mechanical parameters. The incident wave frequency is determined for the workpiece. The incident wavelength is a function of the incident wave frequency.

Method 1000 determines a designated distance for a number of wave sensors from the number of wave generators such that the number of wave sensors receiving a surface wave of a threshold value indicates a surface roughness within a roughness threshold (operation 1005). Afterwards, method 1000 terminates.

In some illustrative examples, method 1000 determines a cut-off wavelength using the material mechanical parameters, wherein the cut-off wavelength is a ratio of surface wavelength over incident wavelength, and wherein the designated distance is determined based on the cut-off wavelength (operation 1007). In some illustrative examples, method 1000 sends the source signal having the signal parameters into the workpiece using a pulser and wave generator (operation 1006). Method 1000 determines if the surface roughness of the workpiece is within a roughness threshold for at least one of roughness width or roughness height based on output of a number of wave sensors (operation 1008).

In some illustrative examples, method 1000 orients the wave generator relative to the workpiece to send the source signal into the workpiece at a source location (operation 1010). The source location is on any desirable location of the surface of the workpiece. In some illustrative examples, orienting the wave generator includes acoustically coupling the wave generator to the surface. In some illustrative examples, the wave generator is in contact with the surface of the workpiece. In some illustrative examples, the wave generator is a non-contact wave generator.

In some illustrative examples, method 1000 orients at least one wave sensor of the number of wave sensors relative to the workpiece to sense waves a designated distance from the source location (operation 1012). The designated distance is selected based on a cut-off wavelength calculated by the ultrasonic analysis system. the cut-off wavelength is a ratio of surface wavelength over incident wavelength. The cut-off wavelength can be customized for different roughness profiles. In some illustrative examples, the cut-off threshold is when λsurface/λwave=0.5.

In some illustrative examples, method 1000 orients the number of wave sensors relative to the workpiece such that the number of wave sensors is oriented to sense waves at at least two different distances from the source location (operation 1014). In some illustrative examples, a series of wave sensors is at different distances from a wave generator. When the number of wave sensors is oriented to sense waves at at least two different distances, surface roughness can be located on the surface. In one illustrative example, operation 1014 is performed in FIG. 4 with series of wave sensors 414. In another illustrative example, operation 1014 is performed in FIG. 6 using at least one of series of wave sensors 618, series of wave sensors 620, or series of wave sensors 622. In yet another illustrative example, operation 1014 is performed in FIG. 7 using series of wave sensors 714.

In some illustrative examples, determining if the surface roughness of the workpiece is within a roughness threshold comprises determining if the surface roughness in a plurality of locations of the workpiece is within a roughness threshold for at least one of roughness width or roughness height based on output of the number of wave sensors (operation 1018). In some illustrative examples, determining if the surface roughness in a plurality of locations of the workpiece is within a roughness threshold comprises determining if surface roughness in a plurality of locations spread in a second direction of the workpiece is within a roughness threshold, and wherein the second direction extends through the at least two different distances (operation 1020). In these illustrative examples, each of the plurality of locations is associated with a respective wave sensor of a series of wave sensors separated in the second direction.

In some illustrative examples, method 1000 sends a plurality of source signals having the signal parameters into the workpiece at a plurality of source locations of the workpiece using a plurality of pulsers and a plurality of wave generators, wherein sending the source signal into the workpiece is one of the plurality of source signals sent into the workpiece (operation 1016). In some illustrative examples, operation 1016 is performed in FIG. 5 by wave generator 510, wave generator 511, and wave generator 512 sending source signals sent into workpiece 502. In these illustrative examples, wave generator 510, wave generator 511, and wave generator 512 send a plurality of source signals at a plurality of source locations spaced in first direction 526. In some illustrative examples, operation 1016 is performed in FIG. 6 by wave generator 610, wave generator 611, and wave generator 612 sending source signals sent into workpiece 602. In these illustrative examples, wave generator 610, wave generator 611, and wave generator 612 send a plurality of source signals at a plurality of source locations spaced in first direction 634. In some illustrative examples, determining if the surface roughness of the workpiece is within a roughness threshold comprises determining if the surface roughness in a plurality of locations of the workpiece is within a roughness threshold for at least one of roughness width or roughness height based on output of the number of wave sensors (operation 1022).

In some illustrative examples, the plurality of locations is spread in a first direction of the workpiece, and wherein the plurality of source signals is spread across the workpiece in the first direction (operation 1024). In some illustrative examples, the plurality of locations is spread across the surface in the first direction of the surface. In some of these illustrative examples, a number of wave generators and an associated number of wave sensors is separated in the first direction.

In some illustrative examples, the plurality of locations is spread across the surface in the first direction and the second direction of the surface. In some of these illustrative examples, a number of wave generators is spread in the first direction and a number of wave sensors is spread in both the first direction and the second direction to form a network of wave sensors. In these illustrative examples, the network of wave sensors may also be referred to as a grid of wave sensors.

Figure 11A:
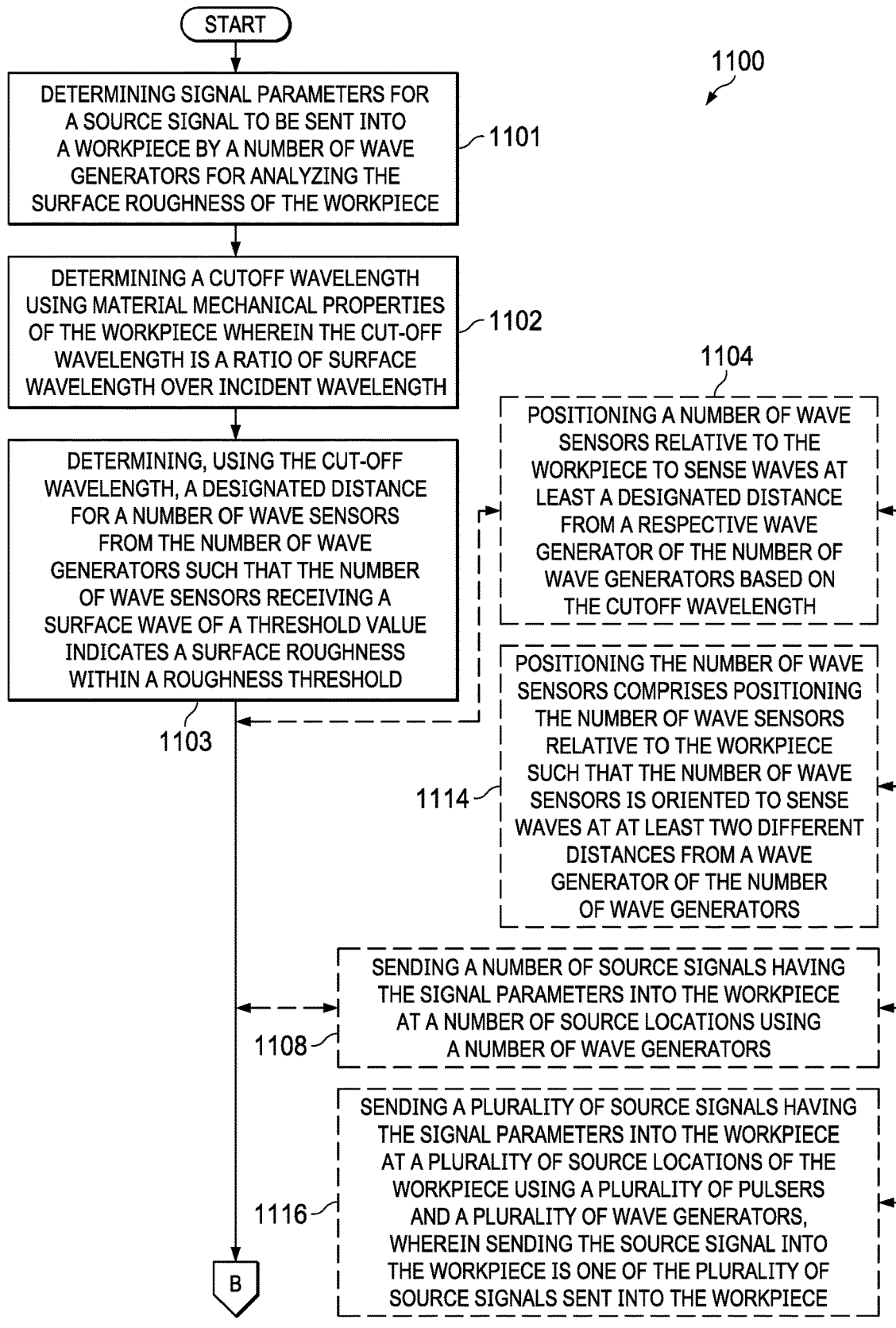
FIGS. 11A and 11B are an illustration of a flowchart of a method of analyzing surface roughness of a workpiece in accordance with an illustrative embodiment.
Figure 11B:
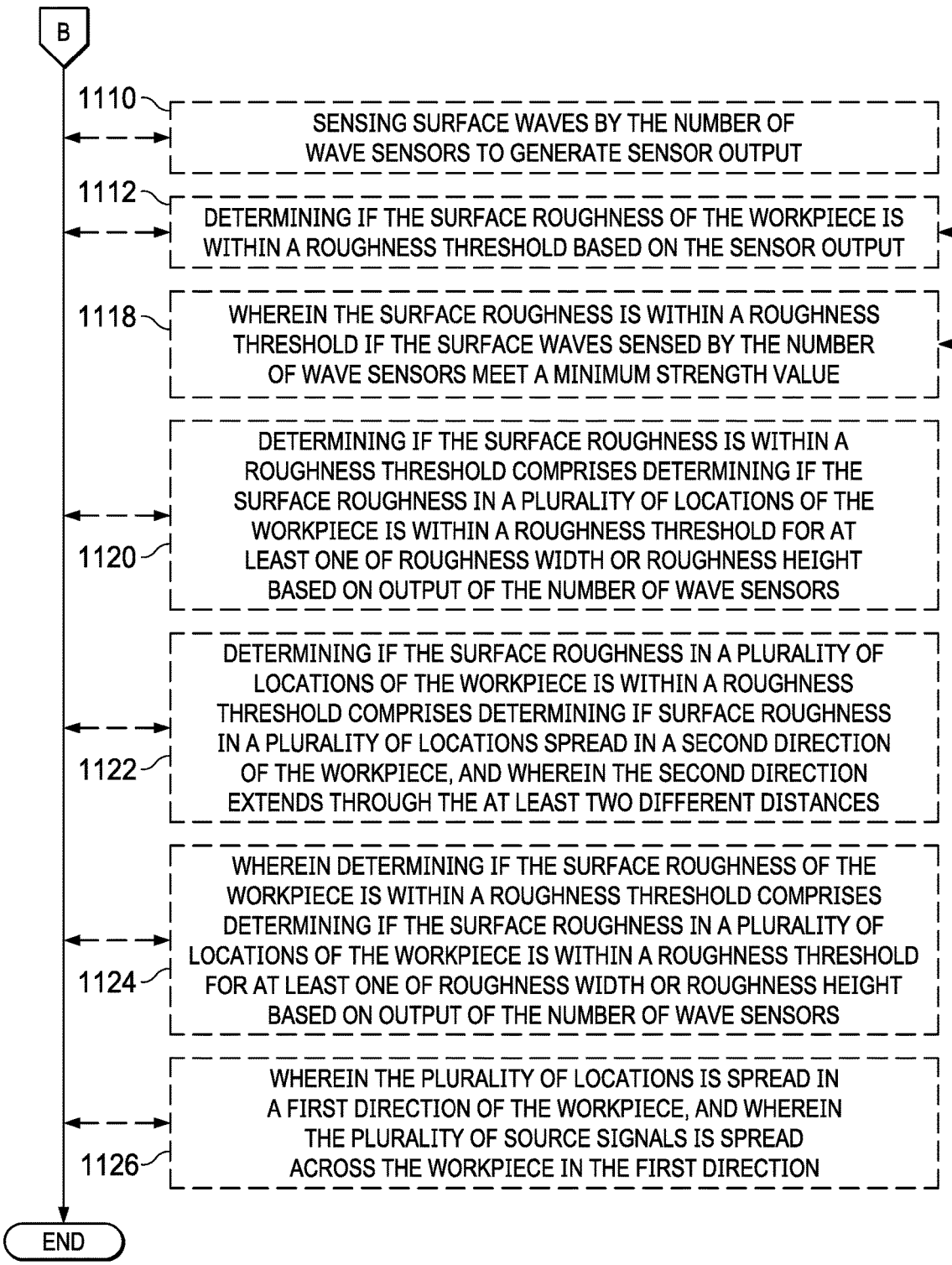

Turning now to FIGS. 11A and 11B, an illustration of a flowchart of a method of analyzing surface roughness of a workpiece is depicted in accordance with an illustrative embodiment. Method 1000 can be implemented using surface roughness analysis system 102 of FIG. 1. Method 1100 can be used to analyze surface roughness 104 of surface 106 of workpiece 108 of FIG. 1. Method 1100 can be used to analyze surface roughness 202 of surface 204 of workpiece 200 in FIG. 2. Method 1100 can be used to analyze surface roughness 312 of workpiece 302 of FIG. 3. Method 1100 can be used to analyze surface roughness 424 of workpiece 402 of FIG. 4. Method 1100 can be used to analyze surface roughness 524 of workpiece 502 of FIG. 5. Method 1100 can be used to analyze surface roughness 624 of workpiece 602 of FIG. 6. Method 1100 can be used to analyze surface roughness 724 of workpiece 702 of FIG. 7. Method 1100 can be used to analyze surface roughness 818 of workpiece 802 of FIG. 8. Method 1100 can be implemented using surface roughness analysis system 900 to analyze a surface roughness of workpiece 902 of FIG. 9.

Method 1100 determines signal parameters for a source signal to be sent into a workpiece by a number of wave generators for analyzing the surface roughness of the workpiece (operation 1101). Method 1100 determines a cut-off wavelength using material mechanical parameters of the workpiece, wherein the cut-off wavelength is a ratio of surface wavelength over incident wavelength (operation 1102). Method 1100 determines, using the cut-off wavelength, a designated distance for a number of wave sensors from the number of wave generators such that the number of wave sensors receiving a surface wave of a threshold value indicates a surface roughness within a roughness threshold (operation 1103). Afterwards, method 1100 terminates.

In some illustrative examples, method 1100 positions a number of wave sensors relative to the workpiece to sense waves at least a designated distance from a respective wave generator of a number of wave generators based on the cut-off wavelength (operation 1104). In some illustrative examples, method 1100 sends a number of source signals having the signal parameters into the workpiece at a number of source locations using a number of wave generators (operation 1108). In some illustrative examples, method 1100 senses surface waves by the number of wave sensors to generate sensor output (operation 1110). In some illustrative examples, method 1100 determines if the surface roughness of the workpiece is within a roughness threshold based on the sensor output (operation 1112).

The surface roughness is within a roughness threshold if the surface waves sensed by the number of wave sensors meet a minimum strength value (operation 1118). When the surface waves meet a minimum strength value, a signal created by the number of wave sensors in response will meet a signal threshold. The signal threshold is set to differentiate signal from noise.

In some illustrative examples, determining if the surface roughness is within a roughness threshold comprises determining if the surface roughness in a plurality of locations of the workpiece is within a roughness threshold for at least one of roughness width or roughness height based on output of the number of wave sensors (operation 1120).

In some illustrative examples, positioning the number of wave sensors comprises positioning the number of wave sensors relative to the workpiece such that the number of wave sensors is oriented to sense waves at at least two different distances from a wave generator of the number of wave generators (operation 1114). In these illustrative examples, the number of wave sensors includes a series of wave sensors positioned at a plurality of distances from the wave generator. When a series of wave sensors is present, a plurality of locations can be analyzed for surface roughness. In some illustrative examples, determining if the surface roughness in a plurality of locations of the workpiece is within a roughness threshold comprises determining if surface roughness in a plurality of locations spread in a second direction of the workpiece is within a roughness threshold, and wherein the second direction extends through the at least two different distances (operation 1122).

In some illustrative examples, method 1100 sends a plurality of source signals having the signal parameters into the workpiece at a plurality of source locations of the workpiece using a plurality of pulsers and a plurality of wave generators, wherein sending the source signal into the workpiece is one of the plurality of source signals sent into the workpiece (operation 1116). In some of these illustrative examples, determining if the surface roughness of the workpiece is within a roughness threshold comprises determining if the surface roughness in a plurality of locations of the workpiece is within a roughness threshold for at least one of roughness width or roughness height based on output of the number of wave sensors (operation 1124). In some illustrative examples, the plurality of locations is spread in a first direction of the workpiece, and wherein the plurality of source signals is spread across the workpiece in the first direction (operation 1126).

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operations 1010 through 1024 may be optional. As another example, operations 1114 through 1126 may be optional.

Figure 12:
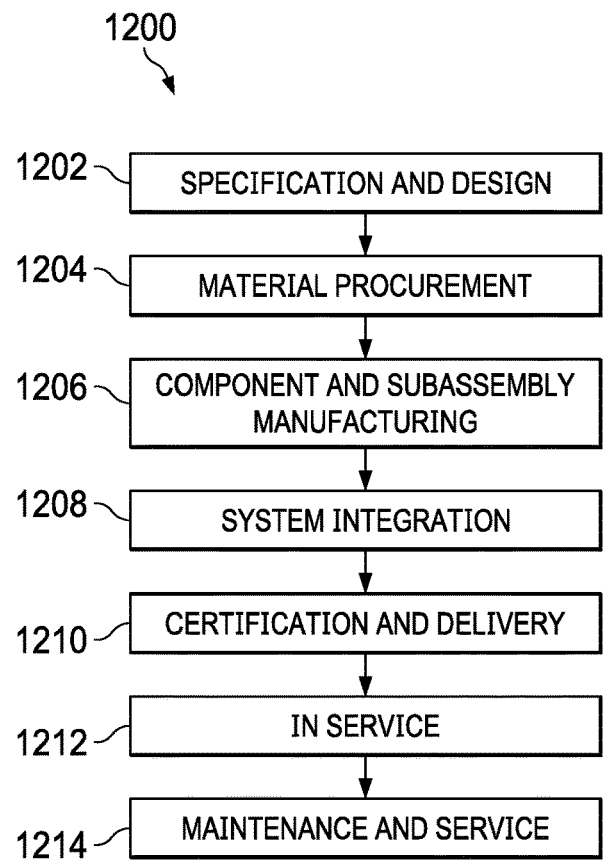
FIG. 12 is an illustration of an aircraft manufacturing and service method in a form of a block diagram in accordance with an illustrative embodiment.
Figure 13:
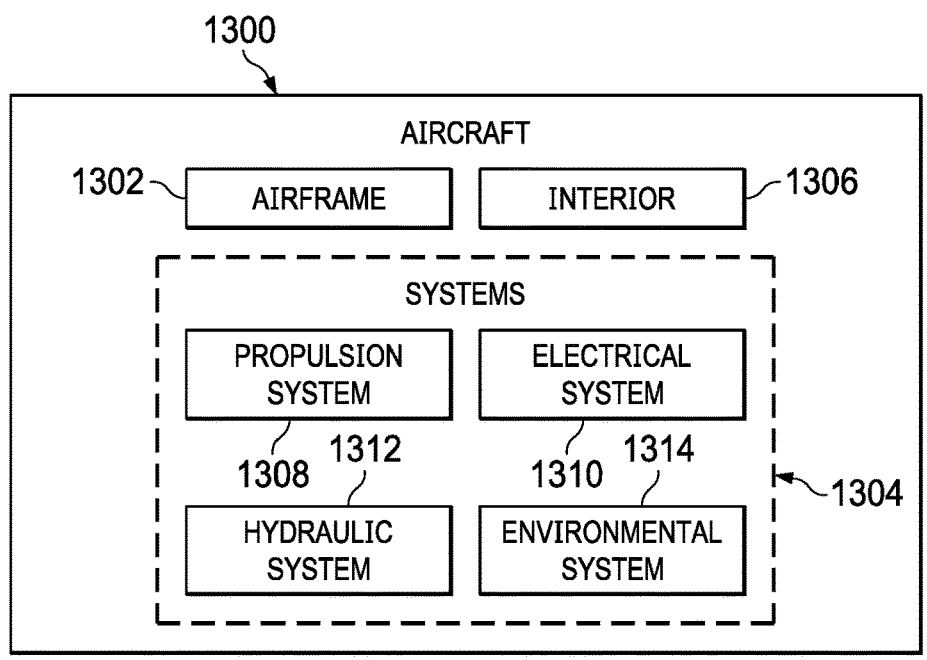
FIG. 13 is an illustration of an aircraft in a form of a block diagram in which an illustrative embodiment may be implemented.

Illustrative embodiments of the present disclosure may be described in the context of aircraft manufacturing and service method 1200 as shown in FIG. 12 and aircraft 1300 as shown in FIG. 13. Turning first to FIG. 12, an illustration of an aircraft manufacturing and service method is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 takes place. Thereafter, aircraft 1300 may go through certification and delivery 1210 in order to be placed in service 1212. While in service 1212 by a customer, aircraft 1300 is scheduled for routine maintenance and service 1214, which may include modification, reconfiguration, refurbishment, or other maintenance and service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft is depicted in which an illustrative embodiment may be implemented. In this example, aircraft 1300 is produced by aircraft manufacturing and service method 1200 of FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included.

Apparatuses and methods embodied herein may be employed during at least one of the stages of aircraft manufacturing and service method 1200. One or more illustrative embodiments may be used to analyze surface roughness of components manufactured or used during at least one of component and subassembly manufacturing 1206, system integration 1208, in service 1212, or maintenance and service 1214 of FIG. 12. Aircraft 1300 can include structures analyzed using surface roughness analysis system 102 of FIG. 1. Surface roughness analysis system 102 of FIG. 1 can be used during component and subassembly manufacturing 1206 to analysis surface roughness of workpieces manufactured during component and subassembly manufacturing 1206. As an example, method 1000 or method 1100 can be used during component and subassembly manufacturing 1206 to analyze surface roughness of a structure. In some illustrative examples, surface roughness analysis system 102 of FIG. 1 can be used during in service 1212, or maintenance and service 1214 of FIG. 12 to analyze any surface roughness caused during in service 1212. In some illustrative examples, the structure inspected using surface roughness analysis system 102 of FIG. 1 is a component of aircraft 1300.

The illustrative examples provide methods to inspect surfaces for roughness after manufacturing applications. Surface acoustic waves are produced by series of transducers and propagate along a surface. The surface roughness analysis system determines a predefined cut-off threshold for Rayleigh wave propagation, which is indicative of the surface roughness description. This cut-off occurs for a particular ratio of the spatial surface waviness and the acoustic wavelength, and the detection of the resulting wave attenuation and decay characterizes the surface roughness.

The illustrative examples can be used in-line with a production process. By using the illustrative examples in-line, the results from the surface roughness analysis system could then be used to adjust manufacturing equipment or processes. For example, using the illustrative examples in-line could identify a time for maintenance or cleaning of manufacturing equipment. The illustrative examples are a particularly an effective approach to measure the quality of 3D printed components formed with additive manufacturing technologies. As another example, using the illustrative examples could signal adjustment of the material deposition rate of an additive manufacturing process to achieve the required product quality. As yet another example, using the illustrative examples could identify workpieces for rework or cleaning prior to further manufacturing processes.

The illustrative examples demonstrate a novel in-line ultrasonic inspection technique using high frequency ultrasonic Rayleigh waves to characterize the surface roughness parameters during manufacturing process. The frequency of incident wave excitation to be used for roughness measurement is adjusted based on the mechanical property structure. The method uses surface wave energy loss and attenuation to characterize surfaces roughness. In some illustrative examples, other wave parameters such as the rate of wave speed changes can also be used to measure surface roughness profile.

The propagation of Rayleigh wave can be used for quality measurement of rough surfaces for structures with different material properties. The surface wave propagation attenuation and decaying rate is used to determine the cut-off ratio where the wave forms do not form due to roughness intensity. In some illustrative examples, the cut-off ratio is at a threshold when $\lambda surface/\lambda wave=0.5$. The cut-off wavelength and effective frequency of inspection can be customized for different roughness profiles.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A surface roughness analysis system comprising:
    an ultrasonic analysis system configured to receive material mechanical parameters for a workpiece, determine incident surface wave signal parameters for a source signal to be sent by a number of wave generators, and determine a designated distance for a number of wave sensors from the number of wave generators such that the number of wave sensors receiving a surface wave of a minimum strength threshold value indicates a surface roughness within a roughness threshold, wherein the minimum strength threshold value is set such that a signal created by the number of wave sensors in response to a surface wave meeting the minimum strength threshold value meets a signal threshold, wherein the signal threshold is set to differentiate signal from noise, wherein the roughness threshold is a predetermined maximum level at which surface roughness is undesirable for the workpiece.

2. The surface roughness analysis system of claim 1, wherein the ultrasonic analysis system is further configured to determine a cut-off wavelength using the material mechanical parameters, wherein the cut-off wavelength is a ratio of surface wavelength over incident wavelength, and wherein the designated distance is determined based on the cut-off wavelength.

3. The surface roughness analysis system of claim 2, wherein the cut-off wavelength is approximately 0.5.

4. The surface roughness analysis system of claim 1, further comprising:
    the number of wave generators configured to send the source signal having the signal parameters into a workpiece; and
    the number of wave sensors positioned at least the designated distance from the number of wave generators.

5. The surface roughness analysis system of claim 3, wherein the number of wave sensors comprises a series of wave sensors, each wave sensor of the series of wave sensors having a different distance from a wave generator of the number of wave generators in a direction of a surface of the workpiece.

6. The surface roughness analysis system of claim 3, wherein the number of wave generators comprises a plurality of wave generators spaced across a surface of the workpiece in a first direction.

7. The surface roughness analysis system of claim 3, wherein the number of wave sensors is positioned at least the designated distance from the number of wave generators to detect surface waves from the workpiece, wherein the designated distance is selected based on the cut-off wavelength calculated by the ultrasonic analysis system.

8. The surface roughness analysis system of claim 3 further comprising:
    a roughness evaluator configured to determine if the surface roughness of the workpiece is below the roughness threshold based on the surface wave sensed by the number of wave sensors.

9. A method of analyzing surface roughness of a workpiece, the method comprising:
    receiving material mechanical parameters of the workpiece;
    determining signal parameters for a source signal to be sent into the workpiece using the material mechanical parameters; and determining a designated distance for a number of wave sensors from a number of wave generators such that the number of wave sensors receiving a surface wave of a minimum strength threshold value indicates a surface roughness within a roughness threshold, wherein the minimum strength threshold value is set such that a signal created by the number of wave sensors in response to a surface wave meeting the minimum strength threshold value meets a signal threshold, wherein the signal threshold is set to differentiate signal from noise, wherein the roughness threshold is a predetermined maximum level at which surface roughness is undesirable for the workpiece.

10. The method of claim 9 further comprising:
determining a cut-off wavelength using the material mechanical parameters, wherein the cut-off wavelength is a ratio of surface wavelength over incident wavelength, and wherein the designated distance is determined based on the cut-off wavelength.

11. The method of claim 10 further comprising:
sending a plurality of source signals having the signal parameters into the workpiece at a plurality of source locations of the workpiece using a plurality of pulsers and a plurality of wave generators, wherein sending the source signal into the workpiece is one of the plurality of source signals sent into the workpiece; and
wherein determining if the surface roughness of the workpiece is within the roughness threshold comprises determining if the surface roughness in a plurality of locations of the workpiece is within the roughness threshold for at least one of roughness width or roughness height based on output of the number of wave sensors.

12. The method of claim 11, wherein the plurality of locations is spread in a first direction of the workpiece, and wherein the plurality of source signals is spread across the workpiece in the first direction.

13. The method of claim 9 further comprising:
sending the source signal having the signal parameters into the workpiece using a pulser and a wave generator; and
determining if the surface roughness of the workpiece is within the roughness threshold for at least one of roughness width or roughness height based on output of a number of wave sensors.

14. The method of claim 13 further comprising:
orienting the wave generator relative to the workpiece to send the source signal into the workpiece at a source location; and
orienting at least one wave sensor of the number of wave sensors relative to the workpiece to sense waves the designated distance from the source location.

15. The method of claim 14 further comprising:
orienting the number of wave sensors relative to the workpiece such that the number of wave sensors is oriented to sense waves at at least two different distances from the source location.

16. The method of claim 15, wherein determining if the surface roughness of the workpiece is within the roughness threshold comprises determining if the surface roughness in a plurality of locations of the workpiece is within the roughness threshold for at least one of roughness width or roughness height based on output of the number of wave sensors.

17. The method of claim 16, wherein determining if the surface roughness in the plurality of locations of the workpiece is within the roughness threshold comprises determining if the surface roughness in the plurality of locations spread in a direction of the workpiece is within the roughness threshold, and wherein the direction extends through the at least two different distances.

18. A method of analyzing surface roughness of a workpiece, the method comprising:
determining signal parameters for a source signal to be sent into the workpiece by a number of wave generators for analyzing the surface roughness of the workpiece;
determining a cut-off wavelength using material mechanical parameters of the workpiece, wherein the cut-off wavelength is a ratio of surface wavelength over incident wavelength; and
determining, using the cut-off wavelength, a designated distance for a number of wave sensors from the number of wave generators such that the number of wave sensors receiving a surface wave of a minimum strength threshold value indicates the surface roughness within a roughness threshold, wherein the minimum strength threshold value is set such that a signal created by the number of wave sensors in response to a surface wave meeting the minimum strength threshold value meets a signal threshold, wherein the signal threshold is set to differentiate signal from noise, wherein the roughness threshold is a predetermined maximum level at which surface roughness is undesirable for the workpiece.

19. The method of claim 18 further comprising:
positioning the number of wave sensors relative to the workpiece to sense waves at least the designated distance from a respective wave generator of a number of wave generators based on the cut-off wavelength;
sending a number of source signals having the signal parameters into the workpiece at a number of source locations using the number of wave generators;
sensing surface waves by the number of wave sensors to generate sensor output; and
determining if the surface roughness of the workpiece is within the roughness threshold based on the sensor output.

20. The method of claim 18, wherein the surface roughness is within the roughness threshold if the surface waves sensed by the number of wave sensors meet a minimum strength value.

21. The method of claim 18, wherein determining if the surface roughness is within a roughness threshold comprises determining if the surface roughness in a plurality of locations of the workpiece is within the roughness threshold for at least one of roughness width or roughness height based on output of the number of wave sensors.

22. The method of claim 18, wherein positioning the number of wave sensors comprises positioning the number of wave sensors relative to the workpiece such that the number of wave sensors is oriented to sense waves at at least two different distances from a wave generator of the number of wave generators.

23. The method of claim 22, wherein determining if the surface roughness in a plurality of locations of the workpiece is within the roughness threshold comprises determining if the surface roughness in a plurality of locations spread in a direction of the workpiece is within a roughness threshold, and wherein the direction extends through the at least two different distances.

24. The method of claim 18 further comprising:
sending a plurality of source signals having the signal parameters into the workpiece at a plurality of source locations of the workpiece using a plurality of pulsers and a plurality of wave generators, wherein sending the source signal into the workpiece is one of the plurality of source signals sent into the workpiece; and wherein determining if the surface roughness of the workpiece is within the roughness threshold comprises determining if the surface roughness in a plurality of locations of the workpiece is within a roughness threshold for at least one of roughness width or roughness height based on output of the number of wave sensors.

25. The method of claim 24, wherein the plurality of locations is spread in a first direction of the workpiece, and wherein the plurality of source signals is spread across the workpiece in the first direction.

26. A surface roughness analysis system comprising:

an ultrasonic analysis system configured to receive material mechanical parameters for a workpiece, determine incident surface wave signal parameters for a source signal to be sent by a number of wave generators, and determine a designated distance for a number of wave sensors from the number of wave generators such that the number of wave sensors receiving a surface wave of a minimum strength threshold value indicates a surface roughness within a roughness threshold, wherein the minimum strength threshold value is set such that a signal created by the number of wave sensors in response to a surface wave meeting the minimum strength threshold value meets a signal threshold, wherein the signal threshold is set to differentiate signal from noise, wherein the roughness threshold is a predetermined maximum level at which surface roughness is undesirable for the workpiece;

the number of wave generators configured to send the source signal having the signal parameters into the workpiece;

the number of wave sensors positioned at least the designated distance from the number of wave generators; and a roughness evaluator configured to determine if the surface roughness of the workpiece is below the roughness threshold based on the surface wave sensed by the number of wave sensors.

27. The surface roughness analysis system of claim 26, wherein the number of wave sensors comprises a series of wave sensors, each wave sensor of the series of wave sensors having a different distance from a wave generator of the number of wave generators in a direction of a surface of the workpiece.

28. The surface roughness analysis system of claim 26, wherein the number of wave generators comprises a plurality of wave generators spaced across a surface of the workpiece in a first direction.

29. The surface roughness analysis system of claim 26, wherein the number of wave sensors is positioned at least the designated distance from the number of wave generators to detect surface waves from the workpiece, wherein the designated distance is selected based on a cut-off wavelength calculated by the ultrasonic analysis system.

30. The surface roughness analysis system of claim 29, wherein the cut-off wavelength is approximately 0.5.

31. A surface roughness analysis system comprising:

a number of wave generators configured to send a source signal having signal parameters into a workpiece, the signal parameters calculated to generate a surface wave in the workpiece;

a number of wave sensors oriented to receive surface waves from the workpiece and positioned at least a designated distance from the number of wave generators, wherein the designated distance is such that receiving the surface wave of a minimum strength threshold value at the number of wave sensors indicates a surface roughness within a roughness threshold wherein the minimum strength threshold value is set such that a signal created by the number of wave sensors in response to a surface wave meeting the minimum strength threshold value meets a signal threshold, wherein the signal threshold is set to differentiate signal from noise, wherein the roughness threshold is a predetermined maximum level at which surface roughness is undesirable for the workpiece; and a roughness evaluator configured to determine if the surface roughness of the workpiece is below the roughness threshold based on a presence or absence of the surface wave sensed by the number of wave sensors.

* * * * *